US009516883B1

(12) United States Patent
Huegerich et al.

(10) Patent No.: US 9,516,883 B1
(45) Date of Patent: Dec. 13, 2016

(54) HEATING ASSEMBLY AND METHOD FOR TORTILLA LIKE FOOD

(71) Applicant: Star Manufacturing International, Inc., St. Louis, MO (US)

(72) Inventors: Michael L. Huegerich, St. Louis, MO (US); Robert D. Lee, St. Louis, MO (US)

(73) Assignee: Star Manufacturing International Inc., St. Louis, MO (US)

( * ) Notice: Subject to any disclaimer, the term of this patent is extended or adjusted under 35 U.S.C. 154(b) by 0 days.

(21) Appl. No.: 14/335,605

(22) Filed: Jul. 18, 2014

Related U.S. Application Data

(60) Provisional application No. 61/847,826, filed on Jul. 18, 2013, provisional application No. 61/975,507, filed on Apr. 4, 2014.

(51) Int. Cl.
  *A47J 37/04* (2006.01)
  *A21B 3/07* (2006.01)
  (Continued)

(52) U.S. Cl.
  CPC . *A21B 3/07* (2013.01); *A21B 1/42* (2013.01); *A21D 13/0074* (2013.01)

(58) Field of Classification Search
  CPC ........... A01B 12/006; A21B 3/07; A21B 1/42; A21D 13/0074
  (Continued)

(56) References Cited

U.S. PATENT DOCUMENTS 2,575,426 A 11/1951 Parnell
2,812,729 A 11/1957 Bahlsen
  (Continued)

FOREIGN PATENT DOCUMENTS

CA  2381950 A1 * 10/2002 .......... A47J 37/0857
EP  0224416 A1   6/1987
  (Continued)

OTHER PUBLICATIONS

Attached hereto is the affidavit of Robert D. Lee dated Oct. 27, 2014. In that affidavit Mr. Lee discloses a prior art product that used a hopper that fed gravy that interfaced with a rotating cylindrical drum that maintained at a temperature to freeze the gravy on the surface of the drum. As explained in the affidavit, frozen layers of the gravy on the drum were chipped off the drum by a frozen plate and shipped to customers.

*Primary Examiner* — Steven Leff
(74) *Attorney, Agent, or Firm* — Polster Lieder Woodruff & Lucchesi, L.C.

(57) ABSTRACT

Disclosed are: an assembly and method for thin bread-like food having a housing, rotatable drum, infeed roller for moving food toward drum rotation, and a drum heater. A radiant heater associated with the housing radiates heat towards food on the drum. Food can be directed toward the infeed roller by an infeed platform. The drum can be rotatably supported by a bearing arrangement. An interior drum heater and a thermostat sensor can also be supported by the bearing. A guide can contact food that separates from the drum, to redirect it toward the drum surface. A discharge scraper can separate food from the drum. A discharge roller can direct food from the drum toward a discharge direction. A motor drive assembly can drive drum, infeed roller and discharge roller rotation.

29 Claims, 20 Drawing Sheets

(51) Int. Cl.
*A21B 1/42* (2006.01)
*A21D 13/00* (2006.01)

(58) Field of Classification Search
USPC .................................................. 99/349, 353
See application file for complete search history.

(56) References Cited

U.S. PATENT DOCUMENTS

| | | | |
|---|---|---|---|
| 2,939,383 A | | 6/1960 | Kanaga |
| 3,291,036 A | * | 12/1966 | Perl ...................... A47J 37/044 219/388 |
| 3,310,007 A | * | 3/1967 | Ford ............................. 219/388 |
| 3,401,626 A | * | 9/1968 | Amalfitano ........... A47J 37/044 165/89 |
| 3,543,694 A | | 12/1970 | Tanguy et al. |
| 3,829,593 A | * | 8/1974 | Hui ........................ A21C 5/006 426/496 |
| 3,830,946 A | | 8/1974 | Ruhdorfer |
| 3,926,105 A | | 12/1975 | Warning, Sr. |
| 4,121,509 A | | 10/1978 | Baker et al. |
| 4,227,447 A | | 10/1980 | Bronnec |
| 4,241,648 A | * | 12/1980 | Longenecker ......... A21C 11/00 100/156 |
| 4,257,172 A | | 3/1981 | Townsend |
| 4,280,402 A | | 7/1981 | Featherstone |
| 4,281,025 A | | 7/1981 | Longenecker |
| 4,363,955 A | | 12/1982 | Gauthier et al. |
| 4,377,109 A | | 3/1983 | Brown et al. |
| 4,386,558 A | | 6/1983 | Holman et al. |
| 4,389,562 A | | 6/1983 | Chaudoir |
| 4,465,701 A | | 8/1984 | Holman et al. |
| 4,534,987 A | | 8/1985 | Holman et al. |
| 4,574,771 A | * | 3/1986 | Gutekunst ............ A47J 37/044 100/168 |
| 4,591,333 A | | 5/1986 | Henke |
| 4,701,340 A | | 10/1987 | Bratton et al. |
| 4,781,169 A | | 11/1988 | Henke et al. |
| 4,881,519 A | | 11/1989 | Henke |
| 4,951,648 A | | 8/1990 | Shukla et al. |
| 5,239,917 A | | 8/1993 | Lutkie et al. |
| 5,266,766 A | | 11/1993 | Hecox |
| 5,317,127 A | | 5/1994 | Brewster, Jr. et al. |
| 5,573,688 A | | 11/1996 | Chanasyk et al. |
| 5,721,805 A | | 2/1998 | Cook et al. |
| 5,747,775 A | | 5/1998 | Tsukamoto et al. |
| 5,906,485 A | | 5/1999 | Groff et al. |
| 6,069,344 A | | 5/2000 | Krasznai et al. |
| 6,114,664 A | | 9/2000 | Cook et al. |
| 6,157,002 A | | 12/2000 | Schjerven, Sr. et al. |
| 6,205,910 B1 | | 3/2001 | Vaughn |
| 6,257,126 B1 | | 7/2001 | Veijkovic et al. |
| 6,369,360 B1 | | 4/2002 | Cook |
| 6,376,817 B1 | | 4/2002 | McFadden et al. |
| 6,572,911 B1 | | 6/2003 | Corcoran et al. |
| 6,670,586 B2 | | 12/2003 | Ingemanson et al. |
| 6,817,283 B2 | | 11/2004 | Jones et al. |
| 7,193,184 B1 | | 3/2007 | Manning |
| 7,424,848 B2 | | 9/2008 | Jones et al. |
| 7,554,057 B2 | | 6/2009 | Monny Dimouamoua |
| 7,851,727 B2 | | 12/2010 | Burtea et al. |
| 8,685,480 B2 | | 4/2014 | Fredlund |
| 2002/0152898 A1 | * | 10/2002 | DuBois et al. ................. 99/349 |
| 2003/0056658 A1 | | 3/2003 | Jones et al. |
| 2003/0110955 A1 | | 6/2003 | Behm |
| 2004/0200831 A1 | | 10/2004 | Shozo et al. |
| 2005/0109216 A1 | | 5/2005 | Jones et al. |
| 2009/0008379 A1 | | 1/2009 | Ingemanson |
| 2009/0139976 A1 | | 6/2009 | Lee |
| 2013/0071534 A1 | | 3/2013 | Newton |
| 2013/0220145 A1 | | 8/2013 | Ros et al. |
| 2014/0026763 A1 | | 1/2014 | Borbolla Gonzalez |

FOREIGN PATENT DOCUMENTS

| | | |
|---|---|---|
| JP | S59197399 A | 11/1984 |
| WO | 87/02866 | 5/1987 |
| WO | 2011/089137 A1 | 7/2011 |

* cited by examiner

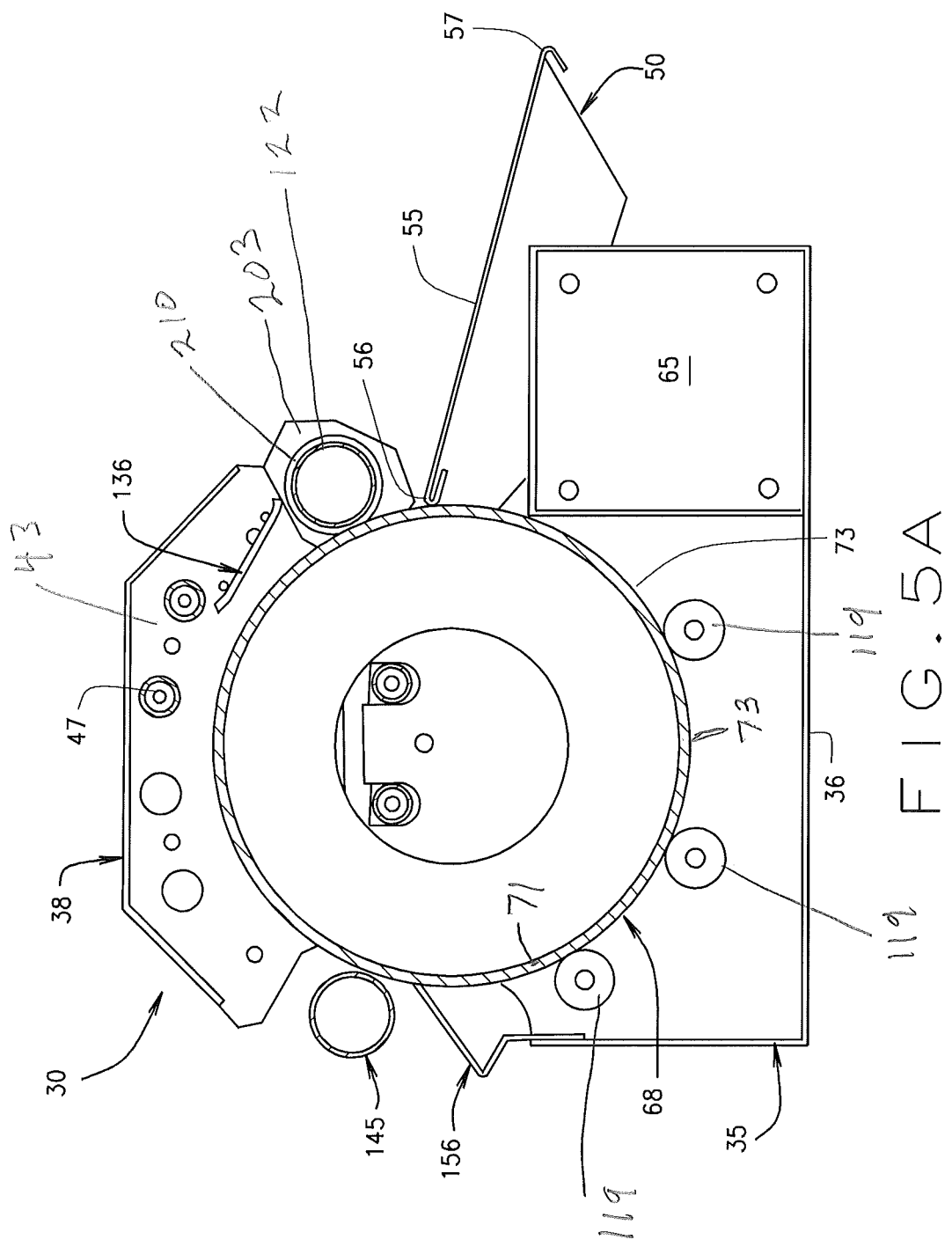

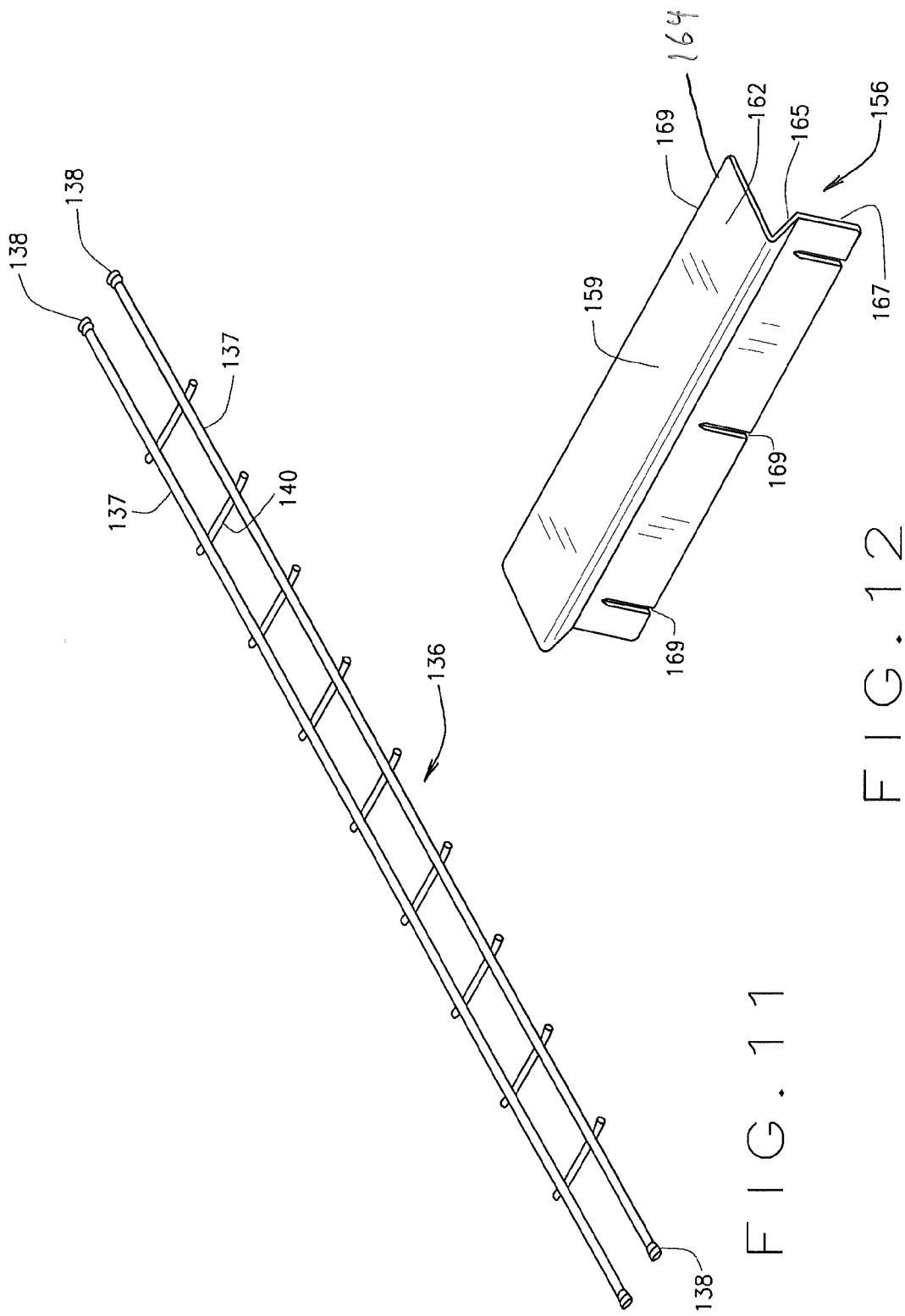

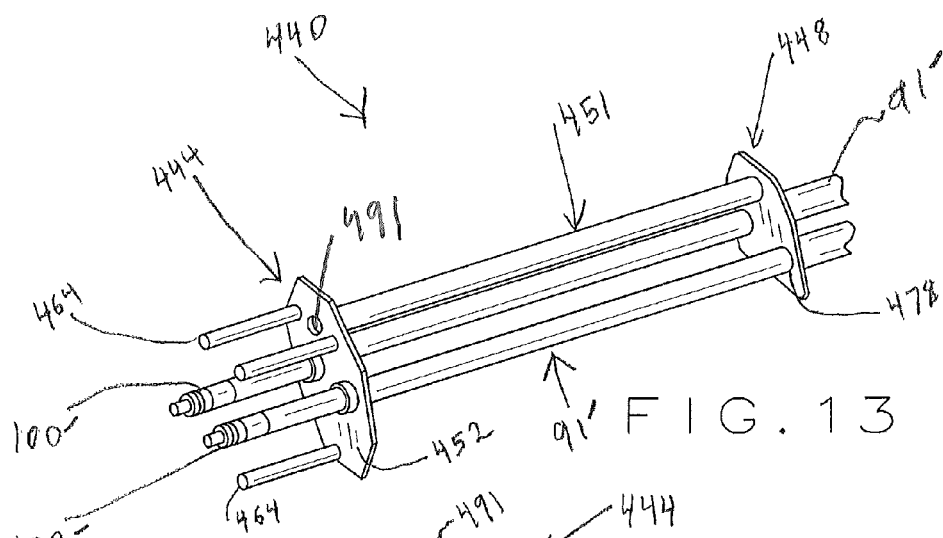
FIG. 13
FIG. 14
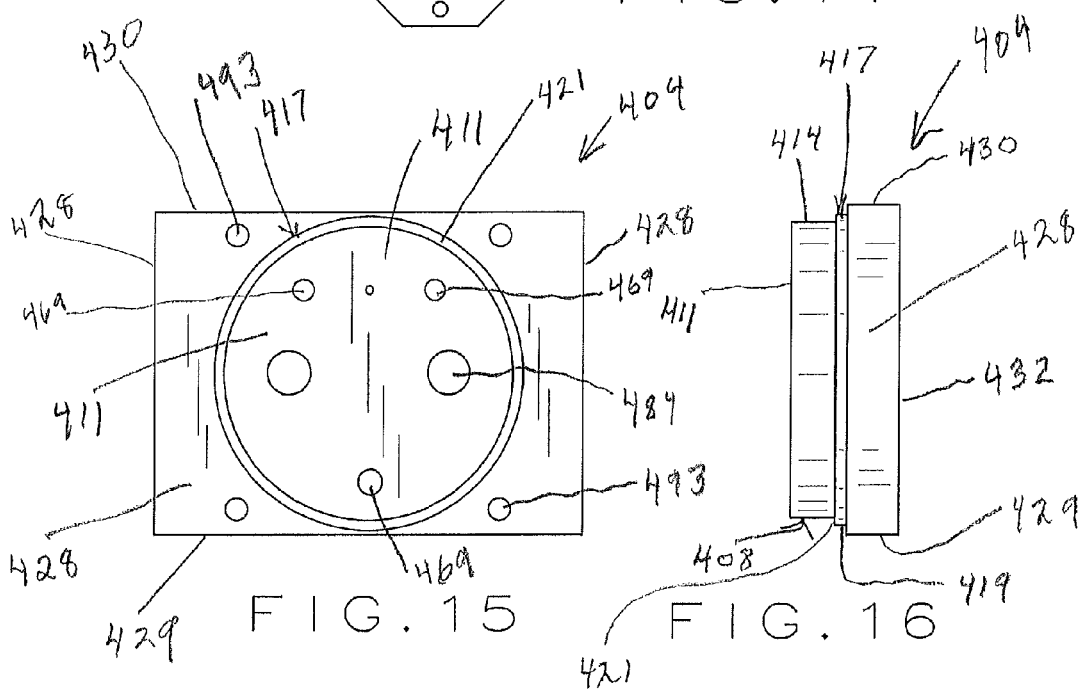
FIG. 15
FIG. 16

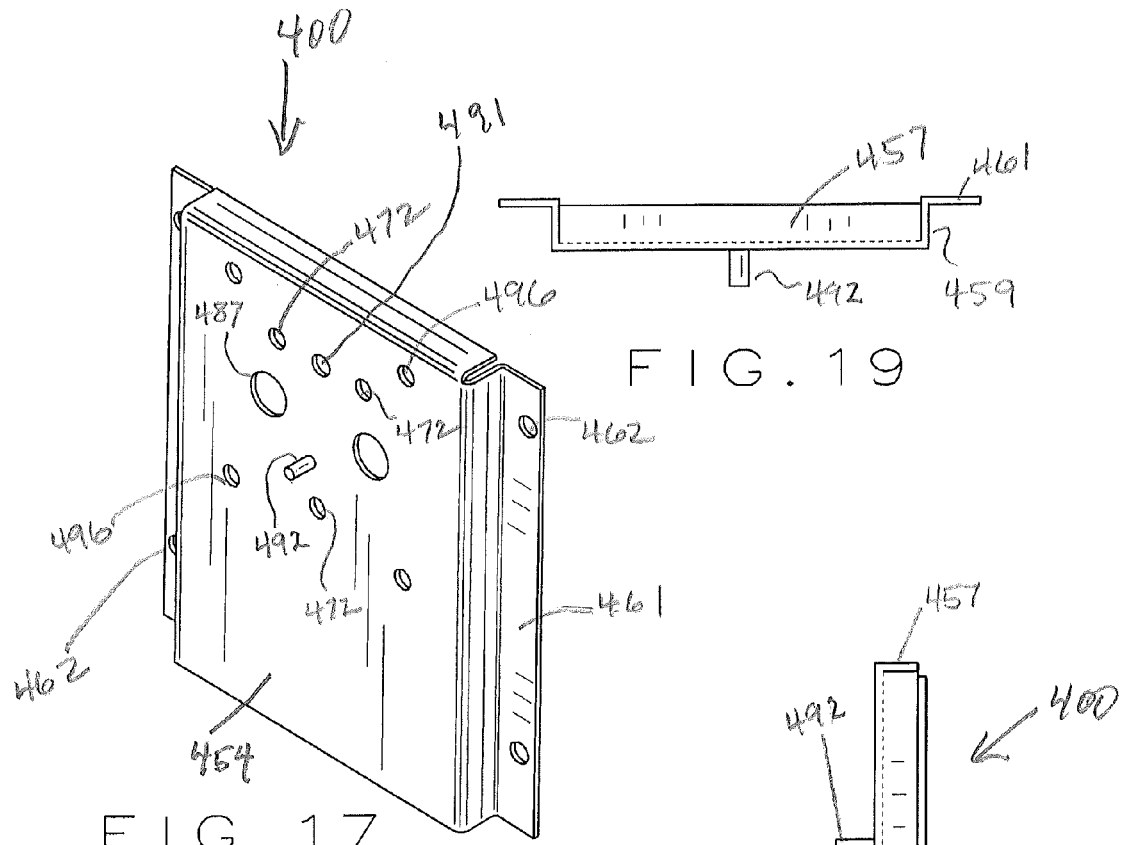
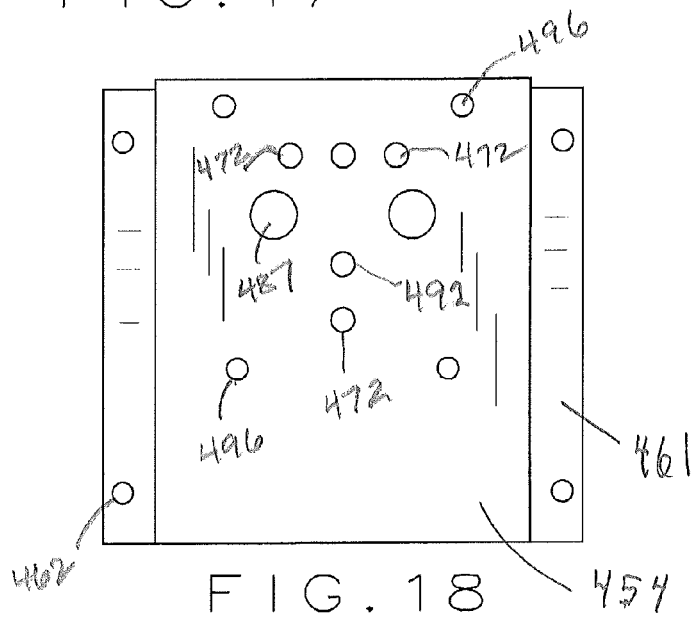

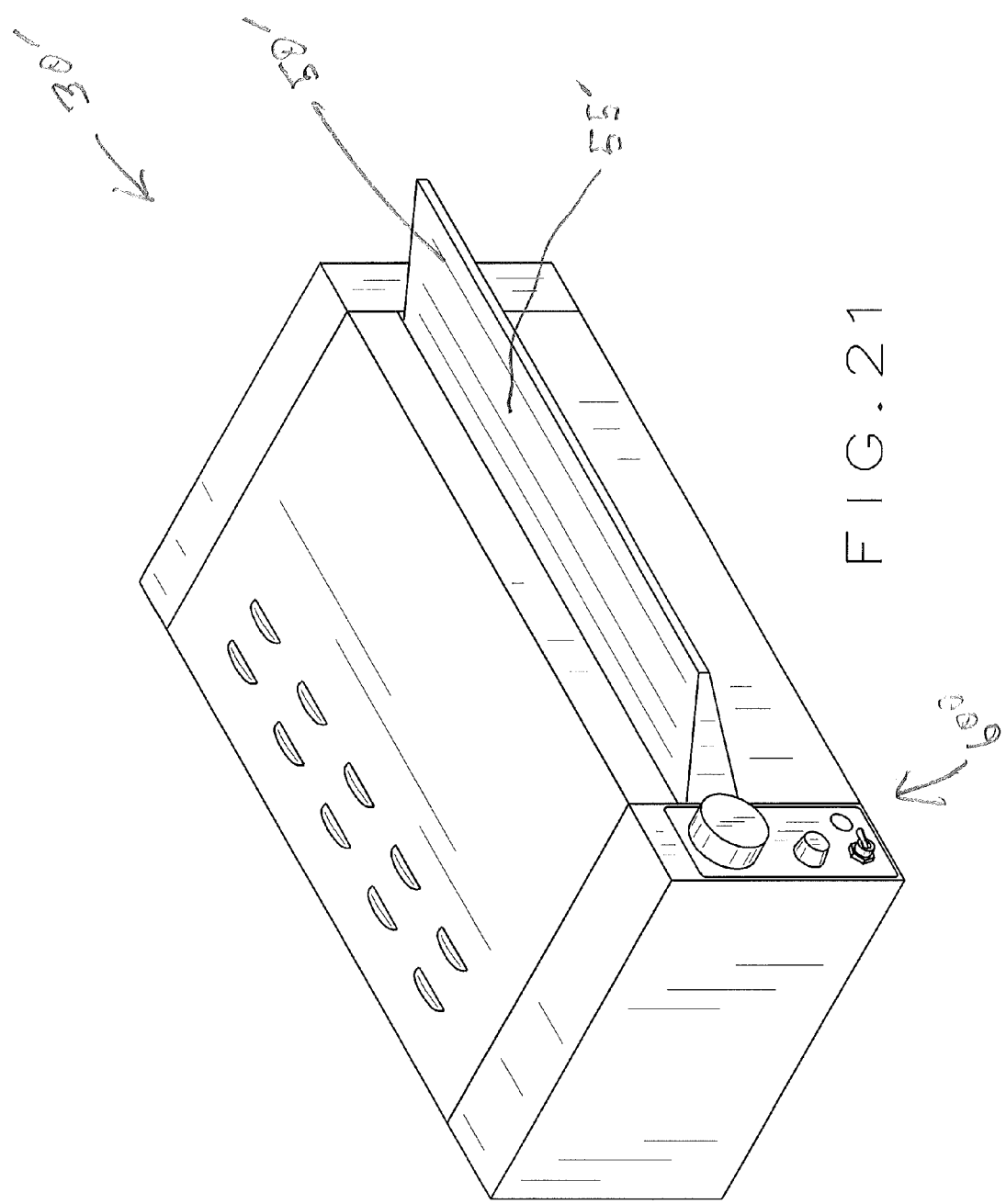

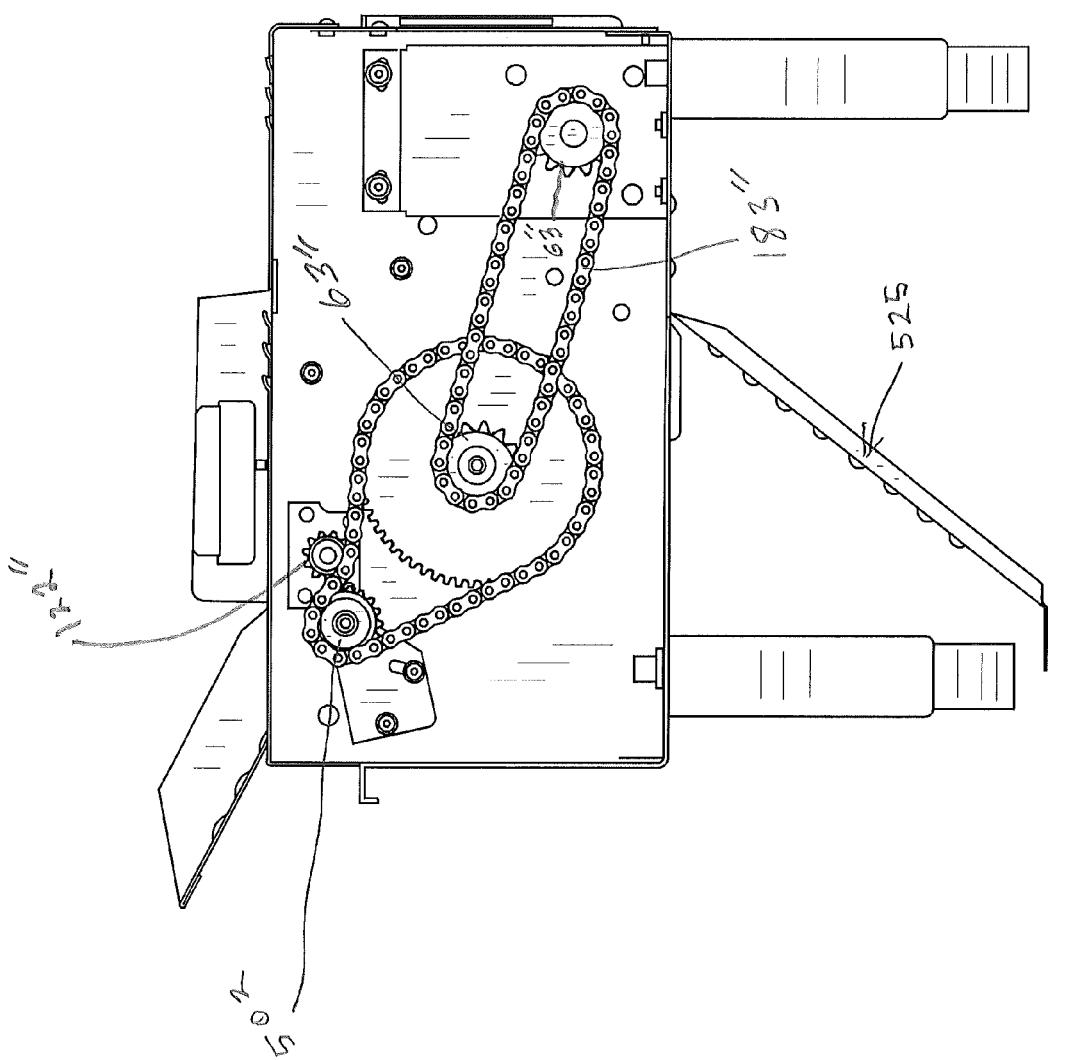

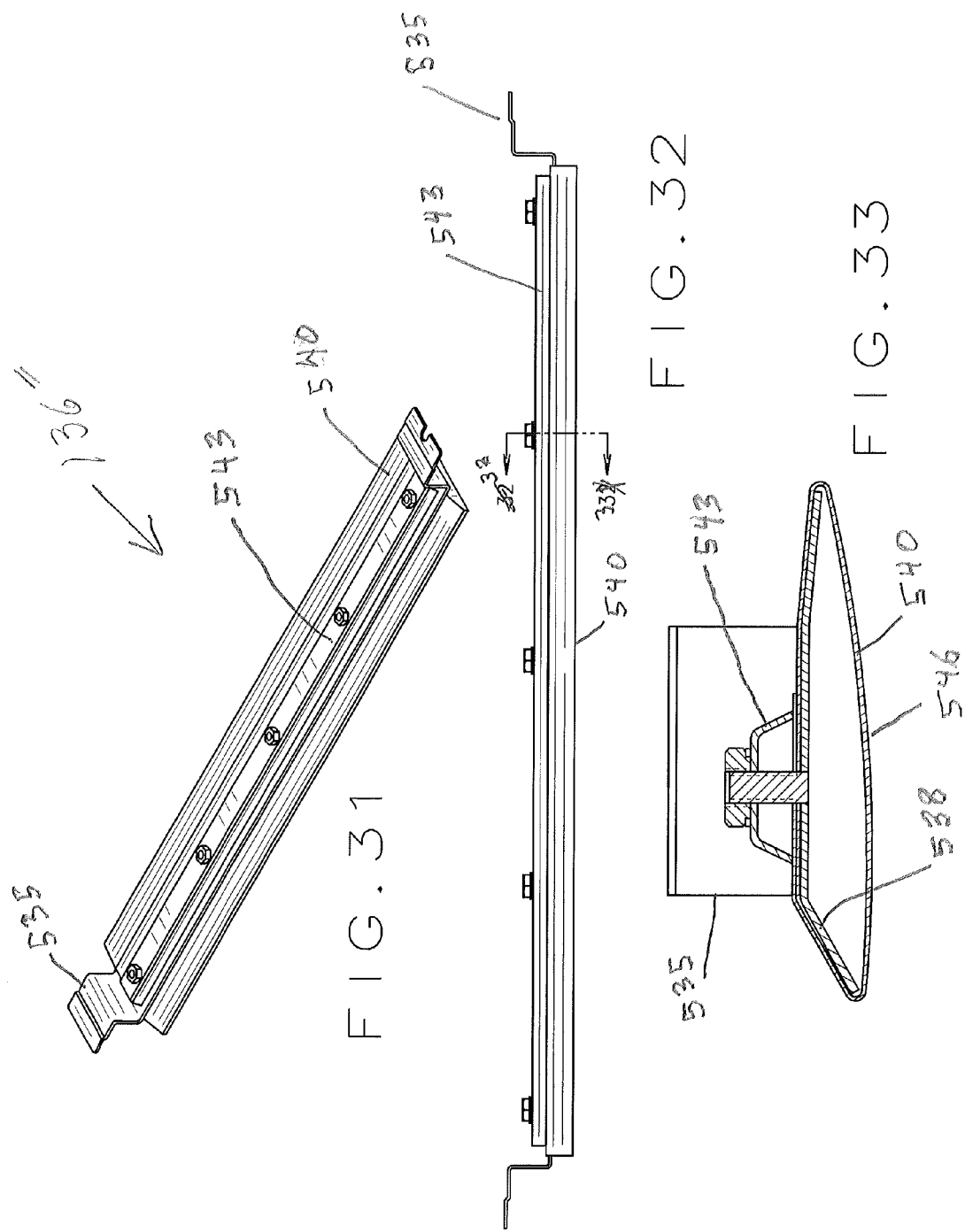

HEATING ASSEMBLY AND METHOD FOR TORTILLA LIKE FOOD

CROSS-REFERENCE TO RELATED APPLICATIONS

This application claims priority to U.S. Provisional Patent Application No. 61/847,826 filed on Jul. 18, 2013, with named inventors Michael L. Huegerich and Robert D. Lee, and also claims priority to U.S. Provisional Patent Application No. 61/975,507 filed on Apr. 4, 2014, having named inventors Michael R. Compton and Robert D. Lee. In addition, this application relates to U.S. Non-Provisional Application entitled: "HEATING ASSEMBLY AND METHOD WITH WRAP TRANSPORT FOR TORTILLA LIKE FOOD", filed contemporaneously with this application and of the law firm Polster, Lieder, Woodruff & Lucchesi, L. C., having Serial No. 14/335,866. All of said applications are incorporated herein by reference.

STATEMENT REGARDING FEDERALLY SPONSORED RESEARCH

Not Applicable.

DESCRIPTION OF THE DRAWINGS

FIG. 5A is a section view of the heating assembly showing the interface between the drum, the infeed roller and the table surface of the infeed cover;

FIG. 11 is an isometric view of a guide frame mounted in association with the radiant hood, for guiding a tortilla or the like toward the drum surface, shown isolated from other components;

FIG. 12 is an isometric view of the discharge scraper at the rear of the assembly, shown isolated from other components;

FIG. 13 is an isometric view of an ensemble of an alternate embodiment for supporting the interior heating element for the drum;

FIG. 14 is an elevation of the proximal plate of the ensemble of FIG. 13;

FIG. 15 is an elevation of a bearing of an alternate embodiment for supporting the drum, and the ensemble of FIG. 13;

FIG. 16 is a side elevation of the bearing of FIG. 15;

FIG. 17 is an isometric view of a bracket for an alternate embodiment employing the ensemble and bearing of FIGS. 13-16;

FIG. 18 is an elevation of the outside of the bracket viewed looking from the left of FIG. 17;

FIG. 19 is a top plan view of the bracket of FIG. 17;

FIG. 20 is a side elevation of the bracket from the perspective viewed from the right side of FIG. 18;

FIG. 21 is an isometric view of an alternate embodiment of a heating assembly;

FIG. 30 is an elevation of the embodiment of FIG. 28, and the drive assembly, with the side cover removed; viewed looking from the right side of FIG. 28;

FIG. 31 is an isometric view of an alternative embodiment of a guide frame assembly shown for the embodiment of FIG. 28;

FIG. 32 is a rear elevation of the guide frame assembly of FIG. 30; and

FIG. 33 is a section taken of the line 32-32 of FIG. 32.

DISCLOSURE OF ASSEMBLY AND METHOD

General Overview of Description of Disclosure

Figure 5:
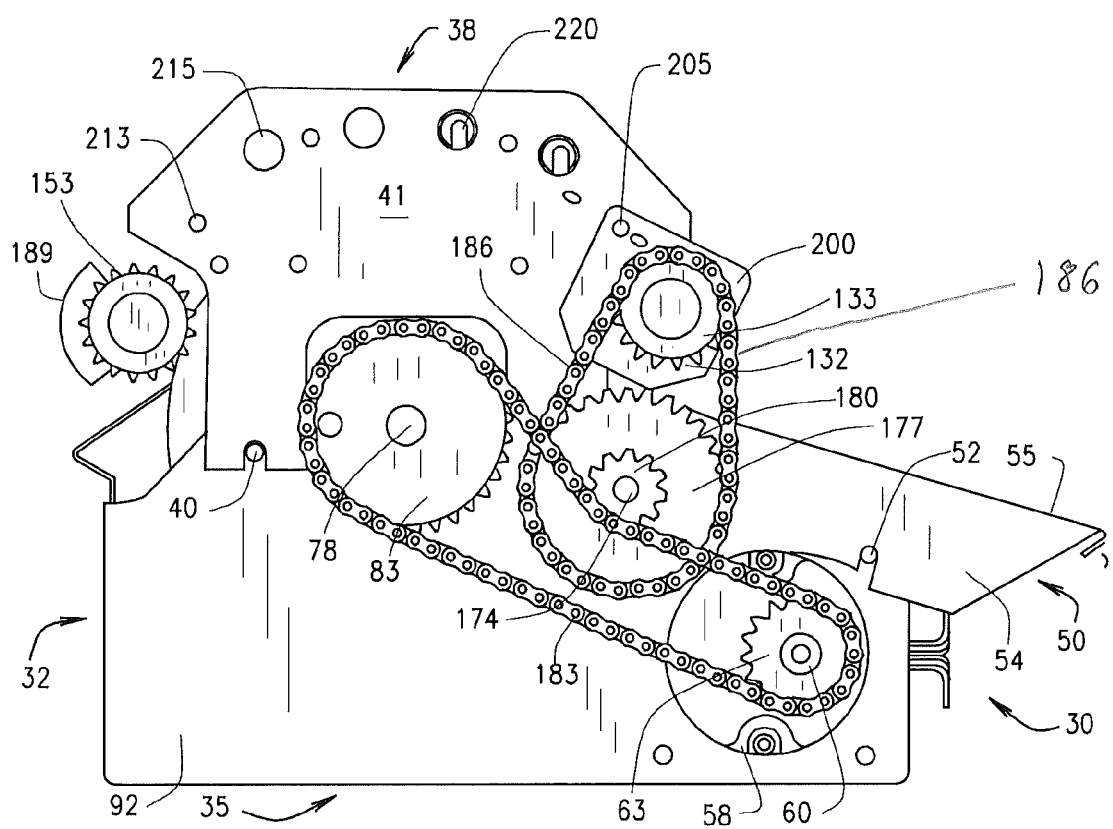
FIG. 5 is a side elevation of the side of the heating assembly about which the drive sprockets are mounted, with some parts shown omitted for clarity.
Figure 6:
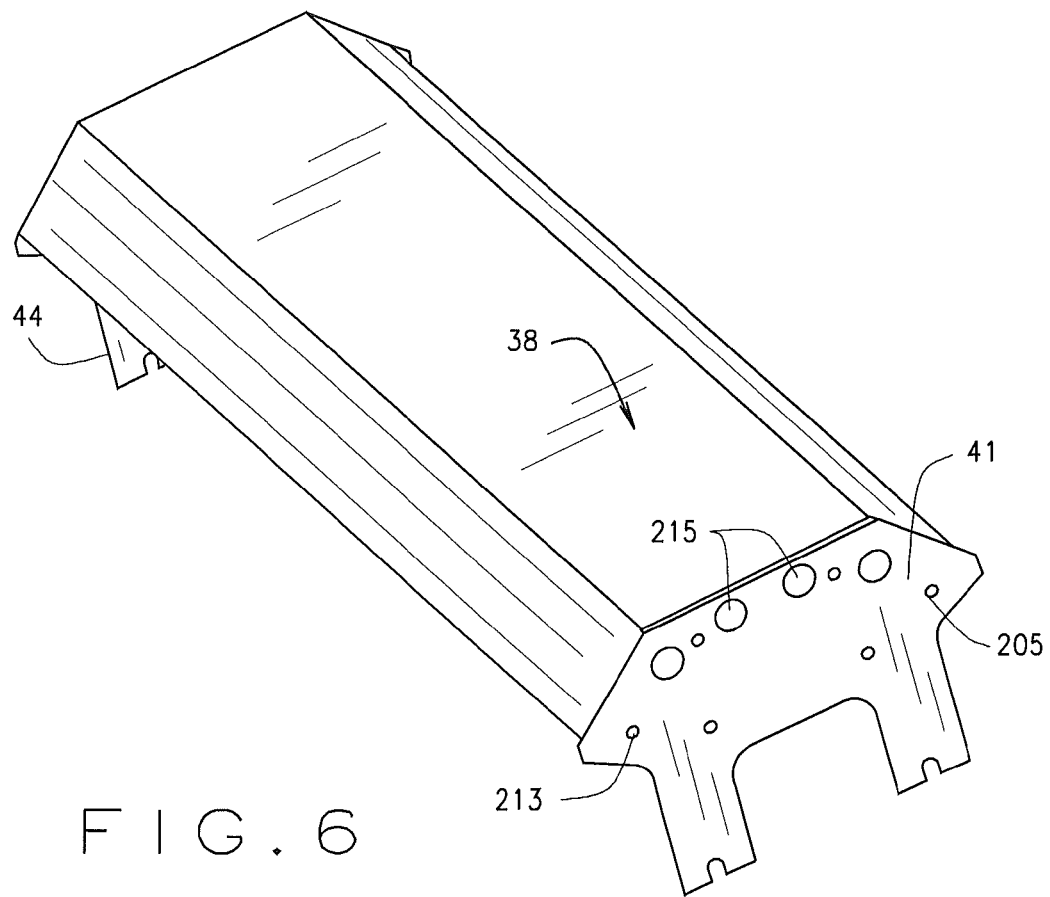
FIG. 6 is an isometric view of the radiant hood shown isolated from other components.

First shall be given a general overview of the system and method. Referring to the drawings, a heating assembly for thin bread-like food, such as tortilla, crepes, pita bread, flatbread, thin pancake, and like food, is illustrated. Such bread-like food is flexible and malleable, and typically has a thickness of ¼ inch or less. Such food further has a first surface and an oppositely facing second surface. The surfaces can lie flat on a flat surface or bend to fit the contour of a surface against which it is pressed. For the sake of simplicity, during the following description, this type of food is referred to as "tortilla." Referring specifically to FIGS. 1-5, an assembly 30 for warming and toasting tortilla like food has a housing 32 which has a lower base section 35 having a bottom wall with a lower horizontal surface 36. Housing 32 has a radiant hood 38 which is generally mounted above base 35 and secured thereto such as by screws 40. FIG. 6 shows an isolated view of hood 38. Radiant hood 38 has a pair of sidewalls 41 and 44. Radiant heating elements 47 are mounted within hood 38.

Figure 7:
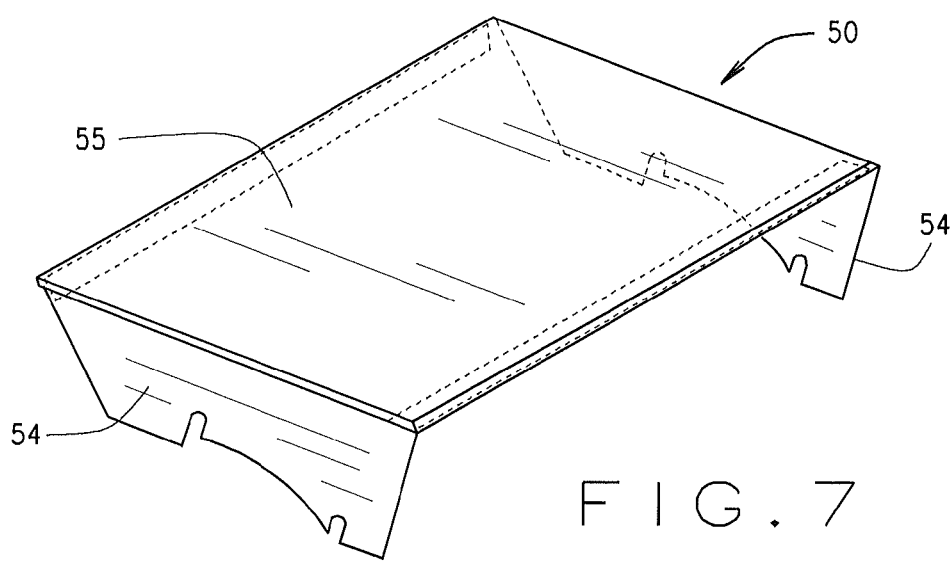
FIG. 7 is an isometric view of the infeed cover shown isolated from other components.

Toward the front of housing 32 an infeed platform cover 50 is mounted to the base 35 as by screws at 52 in slots in infeed platform cover inside walls 54. An isolated view of platform infeed cover is shown in FIG. 7. Infeed cover 50 is preferably generally a flat top surface 55 which is sized to allow a tortilla to be placed flat upon it, and acts as a table upon which a tortilla can be placed to slide upon as a tortilla is fed by hand between an infeed roller and drum, to be described. Surface 55 can be dimpled. The platform surface 55 has a proximal end 56 and a distal end 57. The platform can have an edge that depends downwardly and rearwardly from distal end 57. Within the front of the housing 32 beneath the infeed cover 50 is a motor 58, which can be a variable speed motor. Motor 58 has a rotatable drive shaft 60 with which a sprocket 63 is drivingly associated. Another box-like cover 65 for motor 58 can also be provided beneath cover 50, to further enclose the motor 58 to the degree desired with the housing 30.

Figure 8:
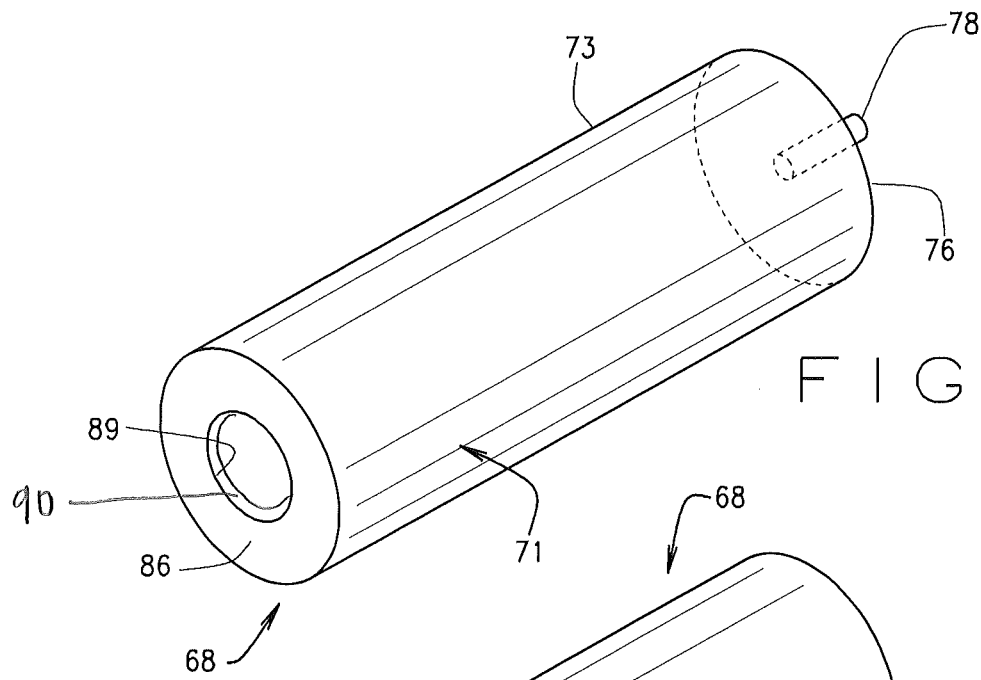
FIG. 8 is an isometric view of the heatable drum viewed looking at the open end of the drum, with the drum shown isolated from other components, and with the opposite end of the drum and part of the shaft shown in dashed lines.
Figure 9:
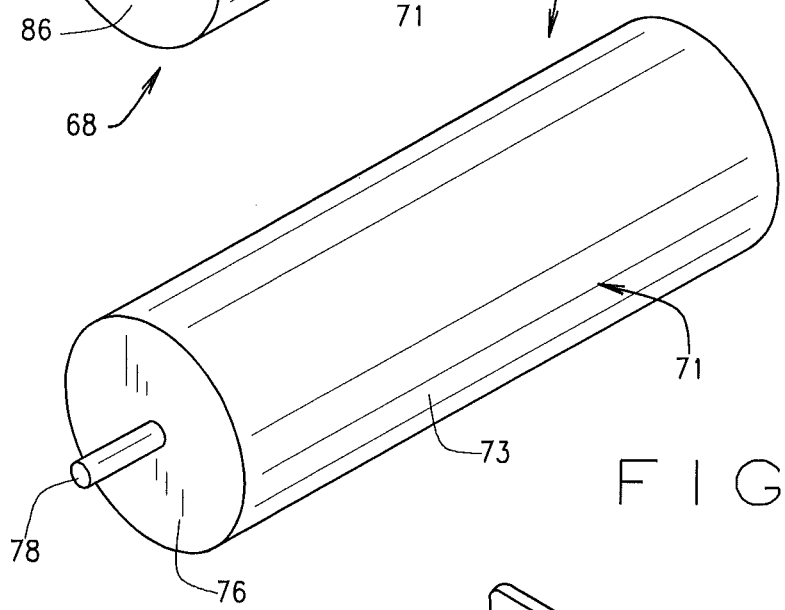
FIG. 9 is an isometric view of the heatable drum shown isolated from other components, with its position reversed from that in FIG. 8.

A heatable drum 68 is rotatably mounted relative to the housing base 35. Isolated views of drum 68 are shown in FIGS. 8 and 9. Drum 68 preferably has a generally cylindrical wall 71 with a generally cylindrical outer surface 73. Toward the right of the apparatus from the view of FIGS. 6 and 8, the drum 68 has a generally flat circular end plate 76 having a central bore thorough which an axially aligned drive shaft 78 extends. The exterior end of drum shaft 78 extends through an enlarged cylindrical sleeve 81 of a circular sprocket 83. The sprocket 83 is in driving rotatable connection with shaft 78 as by a setscrew extending through the enlarged sprocket sleeve 81 to bind against the shaft 78. At the drum's other end, drum 68 has mounted with it an end plate 86 that has a circular outer edge that is secured to the cylindrical drum wall 71 as by welding. End plate 86 has a generally circular opening 89. The drum can be of stainless steel.

A generally U-shaped heating element 91 extends through the end plate opening 89. Base 35 has a right sidewall 92 and a left sidewall 93 (viewed from the perspective of FIG. 1). U-shaped heating element 91 has legs that extend through U-shaped slots 94 that open to the upper edge 96 of base sidewall 93, so that the heating element terminals 100 and 102 extend outside of sidewall 93.

Figure 4:
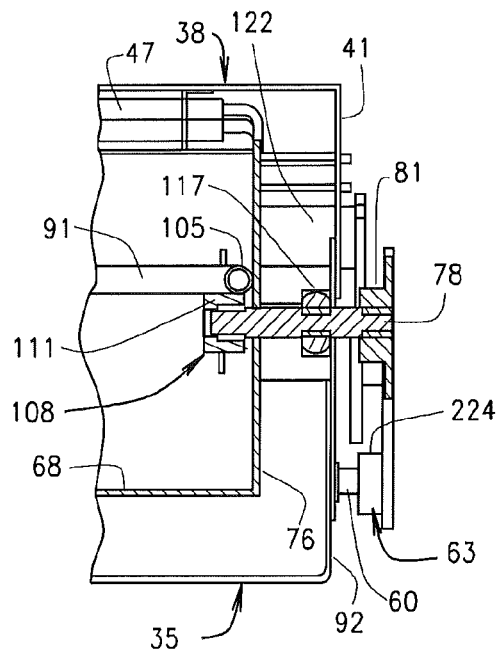
FIG. 4 is a section on the line 4-4 of FIG. 2.
Figure 10:
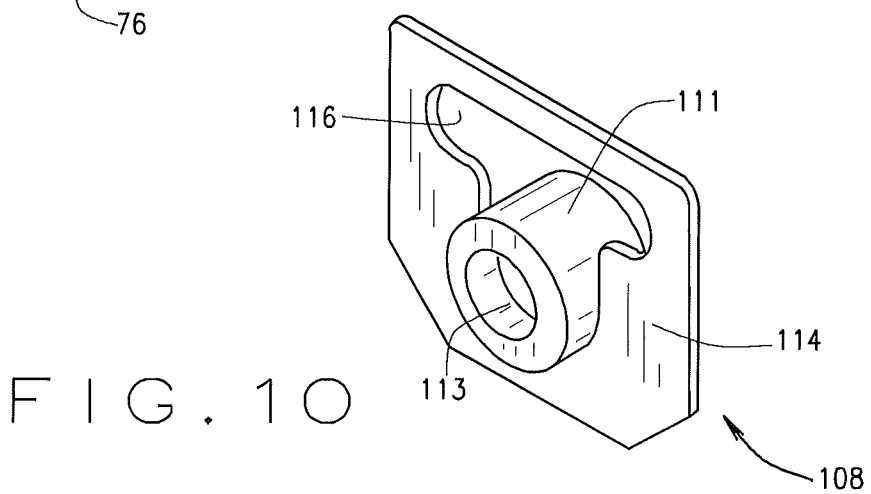
FIG. 10 is an isometric view of the bearing bracket which receives the distal end of the heating element and receives the inner end of the drum shaft, shown isolated from other components.

The curved distal end 105 of element 91 is supported within drum 68 by a bearing bracket 108, shown isolated in FIG. 10. Bearing bracket 108 has a sleeve 111 with a cylindrical bore 113 which receives the inner end of drum shaft 78 for rotation therein. A roller bearing can also be mounted within bore 113 to receive shaft 78, as seen in FIG. 4. The element's curved distal end 105 fits within a transverse slot 116 in bearing bracket wall 114 to be supported thereby by virtue of the bearing bracket 108 being supported by the shaft 78.

To inside of sidewall 92 of base 35 is mounted a roller bearing 117, as a threaded stud and nut. Shaft 78 has an intermediate cylindrical recess which can receive the inner wall of roller bearing 117, so that shaft 78 is supported for rotational motion within bearing 117.

Figure 3:
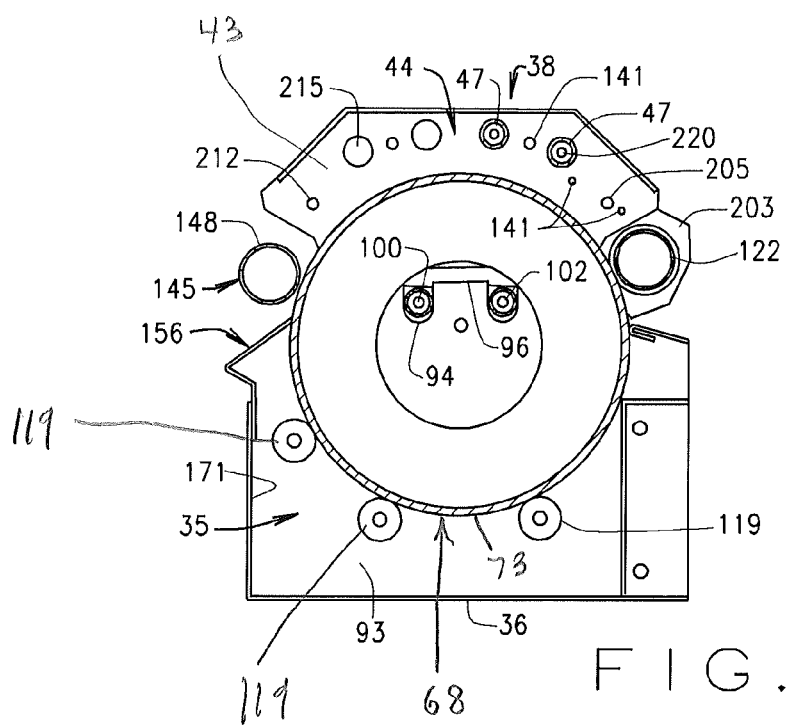
FIG. 3 is a section taken on the line 3-3 of FIG. 2.

Drum 68 can rotate about heater element 91 and be heated thereby, so that the drum surface 73 transmits heat to a tortilla that is in contact with surface 73. Referring to FIG. 3, smaller support rollers 119 are rotatably mounted to shafts that are mounted on the inside of sidewall 92 as by nuts or welding. The exterior surfaces of the rollers 119 contact the drum surface 73 to provide continuous support of the open end of drum 68.

Figure 1:
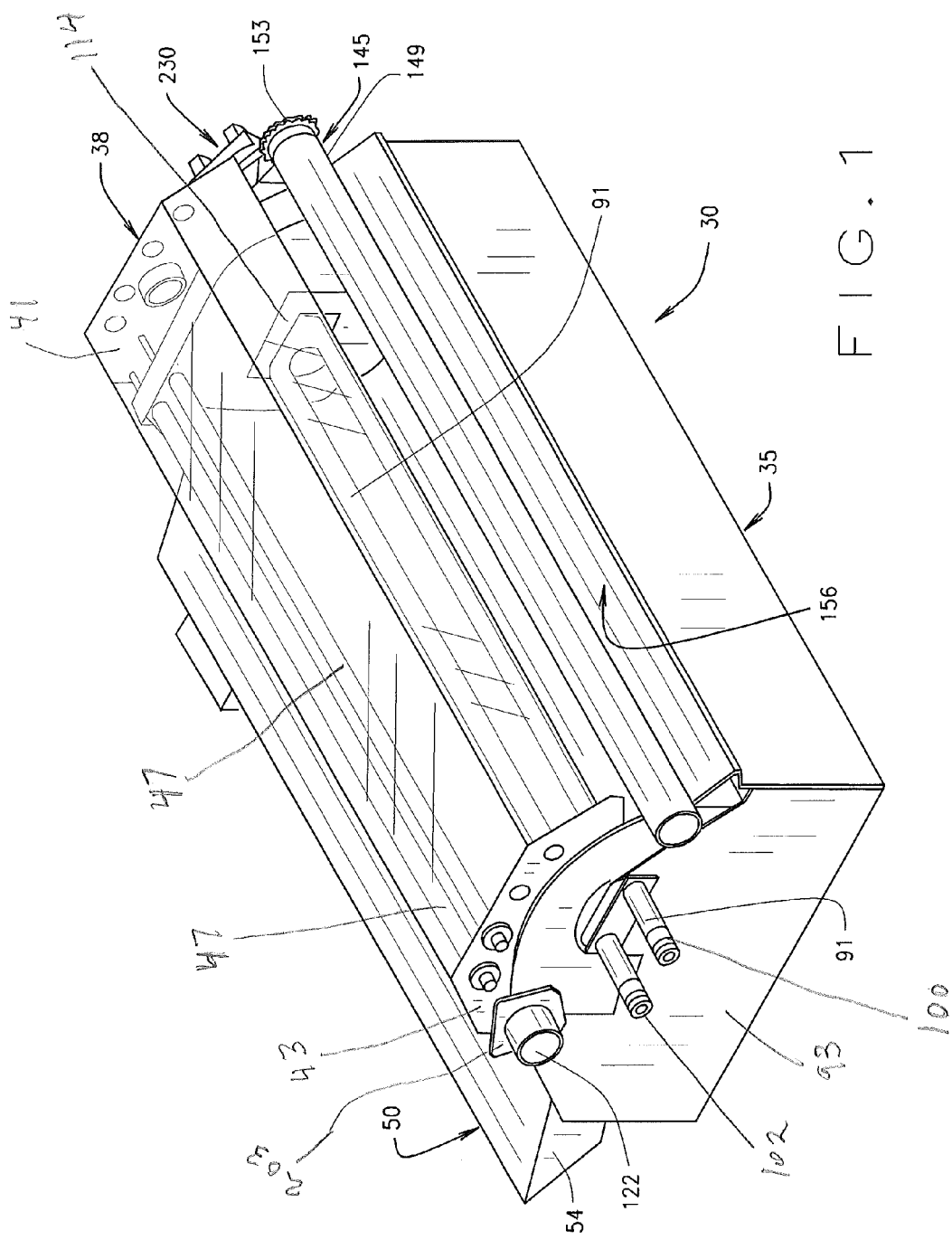
FIG. 1 is an isometric view of the heating assembly, with some parts omitted, and with some parts such as the radiant hood and the infeed cover, shown transparent to reveal parts beneath them.
Figure 2:
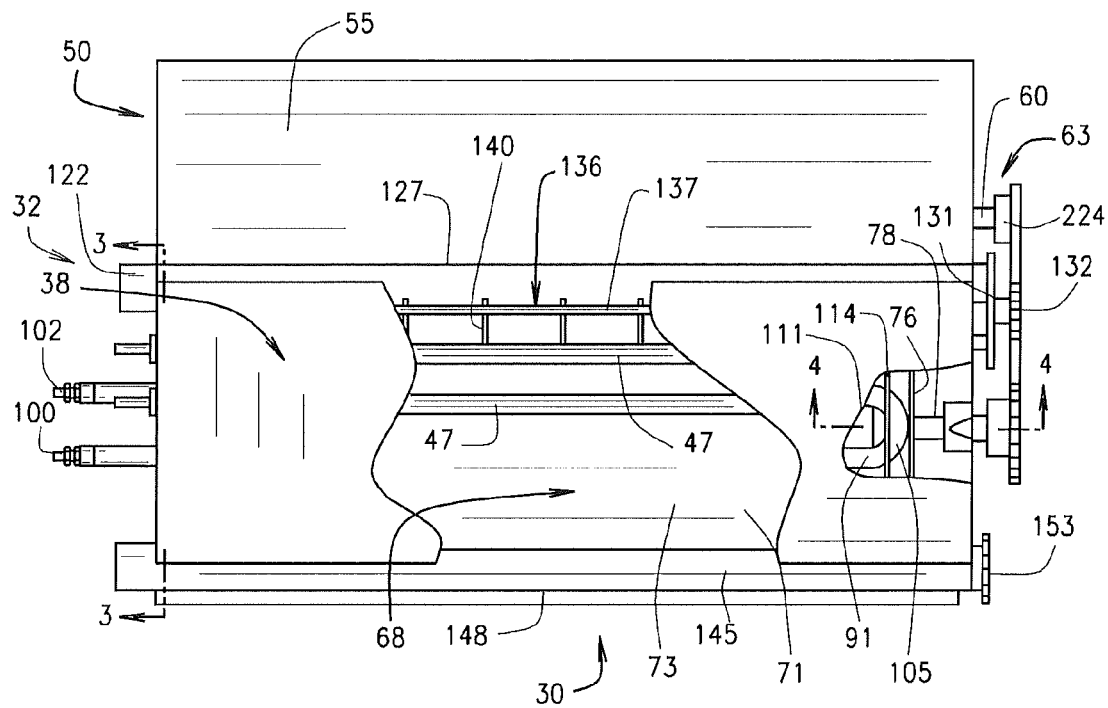
FIG. 2 is top plan view of the heating assembly of FIG. 1, with the radiant hood shown broken at spots to illustrate components there beneath, and with two radiant heating elements illustrated, and with the infeed roller drive sprockets omitted for clarity of the other sprocket illustrations.

Toward the front of radiant hood 38 is an infeed roller 122 which is associated with the hood 38 to pivot relative thereto. The infeed roller 122 has a generally outer cylindrical wall 125 with a generally cylindrical surface 127. Infeed roller 122 has mounted to its right end in driving connection therewith two sprockets 131 and 132. Inner sprocket 131 is the larger of the two, and is mounted to the end of roller 122 as by welding. A fitting 133 extends outwardly from sprocket 131. As shown in FIGS. 2 and 4-5, the second smaller sprocket 131 is mounted upon fitting 133 to the outside of sprocket 131. FIG. 5 does not show sprocket 132. Both sprockets 131 and 132 are thus drivingly connected to roller 122.

The distal end 56 of infeed platform upper surface 55 is spaced to be adjacent to, but not in contact with, drum surface 73. Preferably the distal platform surface end 56 is about ⅟16 inch from drum surface 73. This spacing allows the tortilla to be slid along platform 55 until the edge, and then the undersurface, of the tortilla contacts drum surface 73 to pull the tortilla upwardly toward infeed roller surface 127.

A guide frame 136 is mounted relative to the radiant hood 38. An isolated view of the guide frame 136 is shown in FIG. 11. The guide frame 136 has two longitudinal rods 137 each of which has ends 138. The rods 137 are connected through cross strut rods 140 as by welding, so that the interconnection of the rods 137 and struts 140 provides a rectangular lattice for frame 136. The ends of struts 140 are preferably bent slightly upwardly. The guide frame ends 138 can be secured in openings 141 of the hood sidewalls 41 and 44, as by welding. The guide frame 136 serves to contact a tortilla should the tortilla separate from the drum surface 73, to direct the tortilla away from contact with a radiant heating element 47 and redirect the tortilla into contact with the drum surface 73. This improves the continuous nature of the heating of the tortilla by the drum surface 73. This also helps to ensure that the edge of the tortilla will be directed to contact the surface of a rear pull-down roller to be described.

As shown in FIGS. 1-3 and 5, the assembly 30 can also be provided with a rear hold-down discharge roller 145. Roller 145 has a generally cylindrical surface 148. At its left end, roller 145 has mounted thereto a sprocket 153 as by discharge roller 145. Discharge roller 145 can be pivotally mounted in association with the rear portion of radiant hood 38. Roller 145 acts to maintain a tortilla in contact with the drum surface 73 to provide more direct transmission of heat from the heated drum 71 to the tortilla. The diameter and circumference of the surface of discharge hold-down roller 145 are preferably the same as those for infeed roller 122.

A guide frame, like frame 136, can be mounted in openings of hood sidewalls 41 and 44 like openings 141 for frame ends 138 to deflect a tortilla toward drum 68 and toward the discharge side of the assembly 30.

As shown in FIGS. 1-3, and 5, towards the rear of the base section 35 is mounted a discharge scraper slide 156. An isolated view of the scraper slide 156 is shown in FIG. 12. The scraper slide 156 has an upper blade 159 with a generally flat downwardly sloped upper surface 162 and a blade edge 164 which is located in proximity to the drum surface 73, such as within about ⅟16" to about ⅟32". The proximal end of blade 159 bends downwardly into a wall 165 that slopes toward the base 35, thence extends into a vertical wall 167 having slots 169 which can be affixed to the rear wall 171 of base 23 as by screws extending through the slots 169. Scraper blade 159 serves to separate a warmed tortilla from the rotating drum 68 and direct the tortilla along the downwardly sloped slide surface 162.

The driving connection among the aforementioned sprockets and drive chains to be described is facilitated through an intermediate idler shaft 174 that is rotatably mounted to base 35 as by a stud and bearing assembly. Shaft 174 has two sprockets mounted thereto. A first interior sprocket 177 is mounted near the outside end of shaft 78 for driving engagement therewith, as by the sprocket 177 having a sleeve that receives a setscrew that can press against shaft 78. To the outside of intermediate shaft sprocket 177, a second smaller exterior sprocket 180 is similarly mounted to intermediate shaft 174 for driving engagement therewith. Alternatively, the positions of the smaller sprocket 180 and larger sprocket 177 can be reversed, such as shown in FIGS. 6 and 7, so that the smaller sprocket 180 is on the inside.

Drive chains 183 and 186 are provided to interconnect the motor sprocket 63, drum sprocket 83, front infeed roller sprocket 133 and intermediate sprockets 177 and 180. Drive chain 183 is connected to extend around the motor sprocket 63 and thence extend around drum sprocket 83. The top edge of the first chain 183 also engages the underside of the smaller intermediate sprocket 180 to rotate intermediate shaft 174. The movement of chain 183 thus drivingly rotates drum 68. Second chain 186 extends about the outer intermediate sprocket 177, and from there extends about infeed roller sprocket 132 for drivingly rotating the infeed roller 122. Through these driving chains and sprocket connections, the surface speed of the outer cylindrical drum surface 73 preferably matches speed of the infeed roller's outer cylindrical surface 127.

A third chain 189 (shown partially in FIG. 5) extends about the larger inner sprocket 131 of infeed roller 122. Chain 189 extends rearwardly therefrom to drivingly extend about and drivingly engage the sprocket 153 of hold-down roller 145. This chain 189 connection is such that the rotation of the front infeed roller 122 and its inner sprocket 131 drivingly rotates rear hold-down sprocket 153 and hold-down roller 145, so that the speed of the rear hold-down roller surface 148 preferably matches both the speed of the drum surface 73 and the speed of the infeed roller surface 127.

More Specific Disclosure

Turning to a more specific disclosure of the subassembly of the front infeed roller 122, on each of the hood sidewalls 41 and 44 toward the intake area, are a pair of brackets 200 and 203, respectively. Each bracket 200 and 203 generally has two rounded corners and two beveled corners. Each of brackets 200 and 203 are pivotally mounted as by a nut and bolt at 205 to its respective hood sidewall 41 and 44.

Both brackets 200 and 203 have cylindrical bores with annular plastic bearings 210 extending thereabout. Bearings 210 receive the outer cylindrical surface 127 of infeed roller 122 near each end of roller 122, to allow rotation of the infeed roller 122 relative to the brackets 200 and 203.

In similar fashion to the mounting of the front infeed hold down roller 122, the rear hold-down discharge roller has pivotal mounting to the hood sidewalls 41 and 44. A pair of brackets can be pivotally mounted to the outside of hood sidewalls 41 and 44, such as at the point designated 213 shown in FIG. 5. These rear hold down roller brackets can have the same shape as brackets 200 and 203, with bores having bearings similar to the bores and bearings 210 and 212 which rotatably receive the discharge roller 145 near its ends. This allows the hold-down roller surface 148 to contact said bearings as roller 145 rotates within such brackets.

The pivoting connection of the brackets 200 and 203 to the hood 38 allows the infeed roller 122 to pivot relative to the drum 68 during tortilla intake. Thus when a flat tortilla disk is placed for infeeding between the infeed roller surface 127 and the roller drum surface 73, the weight of the roller 122 presses against the tortilla and the drum surface 73 pulls the tortilla upwardly along drum surface 73. Such infeeding can accommodate various thicknesses of the tortilla, so that for the thicker tortillas, the infeed roller 122 can pivot away from the drum 68 to accommodate the thicker tortilla. On the other hand, if a thinner tortilla is infed, the infeed roller 122 can pivot to be closer to the drum surface 73. Preferably the distance between the drum surface 73 and roller surface 127 before a tortilla is inserted there-between is zero inches (with the surfaces in contact) to about ¼ inch. In the case of the surfaces 73 and 127 being in contact, when a tortilla is fed there-between the surfaces separate so that the tortilla can pass there through.

Hood sidewalls 41 and 44 have cylindrical openings 215 there through to receive fittings and mounts for the rod shaped infrared heating elements 47, for which there are four in the disclosed embodiment. Two of the elements 47 are shown in the broken view of FIG. 2. Electrical insulated wires 220 are connected to the elements to be mounted thereto and powered to emit radiant energy toward a tortilla traveling along the upper roller drum surface 73.

As seen in FIG. 2, sprocket 63 can have an integral central cylindrically shaped sleeve 224 which can have circular bore that receives its respective shaft. Sleeve 224 can have a radially extending bore that receives a setscrew to secure shaft 60 to drivingly rotate therewith.

The drum wall surface 73 can preferably have a diameter ranging from about 4 inches to about 9 inches. The drum width, as well as the width of infeed roller 122 and discharge roller 145, can preferably range from about 8 inches to about 18 inches. The width can be wide enough to accommodate two generally parallel lines of tortillas infed from along the slide table surface 55 of cover 50. The diameter of the infeed roller 122 and discharge roller 145 can preferably range from about 1 to about 2 inches in diameter.

With reference more specifically to FIG. 5A, the angle of a line from the center of the drum 68 to the center of the infeed roller circle 122, relative to the horizontal radius that is parallel to the bottom wall surface 36 of base 35, is shown as about 25°. Such a location allows a tortilla that is discharged from the infeed roller surface 127 to have the force of gravity exerted thereon in a direction to lie against the drum surface 73, which is desired. Such location also allows for the tortilla to have a desirable amount of travel under the radiant heaters 47. The range of the said angle is preferably between about 20° to about 30°.

The angle of the tortilla slide table surface 55 to the horizontal radius extending through drum 68, parallel to the lower surface of bottom wall surface 36 of base 35, is shown preferably at about 15°, and preferably is within a range of about 10° to about 25°. Such angling facilities the tortilla moving upwardly along with the drum surface 73.

In operation, a tortilla can be placed on infeed table surface 55 and slid by hand there-along to be fed between the infeed roller 122 and the drum surface 73. From the perspective of FIG. 5, the infeed roller 122 rotates in a clockwise direction, while the heating drum 68 rotates in a counterclockwise direction. Thus, as both the drum 68 and the infeed roller 122 rotate in said directions, the tortilla is gripped between drum surface 73 and infeed roller surface 127, and pulled by the grip of those rotating surfaces to move in an upward direction to proceed in a counterclockwise direction relative to drum 68 along the drum outer surface 73. As the tortilla moves along with drum 68, it is heated along its underside by the heat from the drum 68 to warm the tortilla. Further, during such travel, radiant heat from the radiant heating elements 47 is emitted to provide gentle toasting of the outer surface of the tortilla as it travels with the drum 68.

The tortilla continues to travel along with the drum surface 73 towards the rear discharge area of the assembly 30. As the tortilla approaches the discharge slide scraper 156, the rear pull down roller 145 is rotating in a clockwise direction so that its surface 148 can contact the outer tortilla surface to press it against the drum surface 73. When the tortilla contacts the scraper blade edge 164, the blade 159 peals it away from the drum surface 73, so that the tortilla slides down the blade slide surface 162 toward a tray or receptacle (not shown).

Thus it can be seen that the path of the tortilla or bread-like food is in a generally circular arcuate path that traces the rotational movement of the surface 73 of drum wall 71. The malleable and flexible composition of the tortilla and other bread-like foods heated by assembly 30, allows the tortilla to be configured to bend along the curvature of the drum surface 73 to travel with the drum surface without sliding about. Preferably the tortilla maintains the same area of contact against the drum surface 73 throughout its path from leaving the infeed roller surface 127. The pressure applied by infeed roller surface 127 against the tortilla helps to keep the tortilla in the same position relative to the drum surface 73 as drum 68 rotates.

The temperature of the drum 68 is controlled through power input control or temperature feedback and regulation to control the heating element 91. Such power input control is as a percentage of maximum available input. Temperature regulation control can be by a mechanical thermostat or proportional electronic control. Temperature sensors can be placed at specific locations, such as in a casing 230 shown in FIG. 1, to provide feedback to a thermostat controller.

The hood radiant infrared heating elements 47 have power input control to enable maintaining consistent infrared power to the product surface.

The infeed roller 122 and discharge roller 145 can both be of stainless steel. The housing components base 35, cover 50, and hood 38 can be of stainless steel.

The system and method allows for improved consistency of appearance and texture.

In the embodiment shown, the infeed roller and rear pull down roller are not heated. The speed of the infeed roller and the drum along their surfaces is consistent along the surfaces of the cylindrical wall of the infeed roller and the cylindrical wall of the drum 68. However the RPMs of the infeed roller 122 and discharge roller 145 would be greater than that of the drum 68 because of the difference in the circumference of the infeed roller 122 and discharge roller 145 to that of the drum wall 71. The infeed roller 122 and discharge roller 145 could each be held so that their surfaces are a fixed distance from the drum surface 73. Such fixed distance can be adjusted by a mechanical stop. Alternatively, the distance could be maintained with rings on the rollers 122 and 145, which only contact the heated drum 68 along the tortilla path. The spacer rings could be a heat resistant rubber that would maintain consistent spacing and help drive the assist roller at a speed matching that of the drum. The assist rollers 122 and 145 could also be driven with a mechanical gearing system to match the surface speeds of the drum 68 and assist rollers 122 and 145.

Rather than having a heating element for the drum 68 located within the drum, a heating element can instead be mounted outside of the drum, such as directly beneath the drum to heat the drum's outer surface as it rotates by that heating element. However, the positioning of the element within the drum such as shown in the drawings is considered to be the more efficient way to heat the drum 68. The drum can be removably mounted within the housing 35, such as by having a releasable coupling of the drum shaft from its drive sprocket 83.

Instead of sprockets as shown, gears or belts and pulleys could be used to match the drum surface 73 speed to the speed of the infeed roller surface 127 and speed of the discharger roller surface 148.

An alternative arrangement, which is the preferred embodiment, for mounting and stabilizing the drum and its heating element is shown in FIGS. 13-19 and 26. Rather than using multiple exterior bearings for support, this alternative employs a support bearing that supports both the drum and the drum's heating element. More specifically, FIGS. 13-19 and 26 show a drum 68' that has a cylindrical wall 71' with a cylindrical outer surface 73'. The drum's end wall 86' has a generally circular opening 89' which has an inwardly facing cylindrical surface 90'. In this embodiment, the sidewall 93' of base 35', and a bracket 400 connected to the base 35', act to mount a bearing 404 that supports the drum 68' and heating element 91'. As seen more clearly in FIGS. 15 and 16, the bearing 404 has an inwardly extending cylindrical section 408. Section 408 has a generally flat inwardly facing circular surface 411, and an outer cylindrical surface 414. Section 408 extends outwardly into a larger cylindrical section 417 that has a cylindrical outer surface 419. An annular should 421 is formed at the junction of section 408 with section 417.

Cylindrical section 417 extends into a larger rectangular section 427 that has shorter sidewalls 428 and longer bottom and top walls 429 and 430, respectively. Section 427 has a generally flat rectangular outwardly facing surface 432, and an inwardly facing surface 428.

The bearing 404 is associated with a support ensemble 440 for the heating element 91', shown in FIG. 13. Generally, the ensemble 440 has an octagonally shaped plate 444, a hexagonal shaped plate 448, both of which are connected to a cylindrical cantilever/sensor tube 451. The proximal end of tube 451 is mounted to octagonal plate 444 as by being inserted by a press fit, welded or swaged into a conforming bore in plate 444. The distal end of tube 451 is mounted to hexagonal plate 448, such as by being press fit, swaged or welded within a conforming bore in plate 448. In such configuration, the plates 444 and 448 are held generally parallel to each other and generally perpendicular to tube 451. Plate 444 has a flat proximal side surface 452.

As shown more clearly in FIGS. 17-20, bracket 400 has a principal vertical flat faced back 454, with an inward top flange 457 extending there from. The back 454 also has a pair of side flange section 459 that extend inwardly, and from there extend at a right angle into flanges 461 that are parallel with sidewall 93". The flanges 461 each have a pair of bores 462 through which bolts can extend, and through aligned bores in base sidewall 93' to hold the bracket 404 to sidewall 93' as by washers and nuts.

Octagonal Plate 444 is mounted to bearing 404, with the flat proximal side surface 452 of plate 444 abutting the flat inner bearing surface 411. Plate 444 is securely held to bearing 404 by three bolts 464 that extend through aligned bores 466 in plate 444, bores 469 in bearing 404, and bores 472 in bracket back 454, and held thereto as by nuts and washers.

Plate 448, plate 444, bearing 404 and bracket 400, each have a pair of aligned holes 478, 481, 484 and 487, respectively, which are sized to snugly received a corresponding leg of U-shaped heating element 91'. The terminal ends 100' and 102' of element 91' extend beyond the outer side of bracket back 454, so that they can be electrically connected to power wires.

Figure 27:
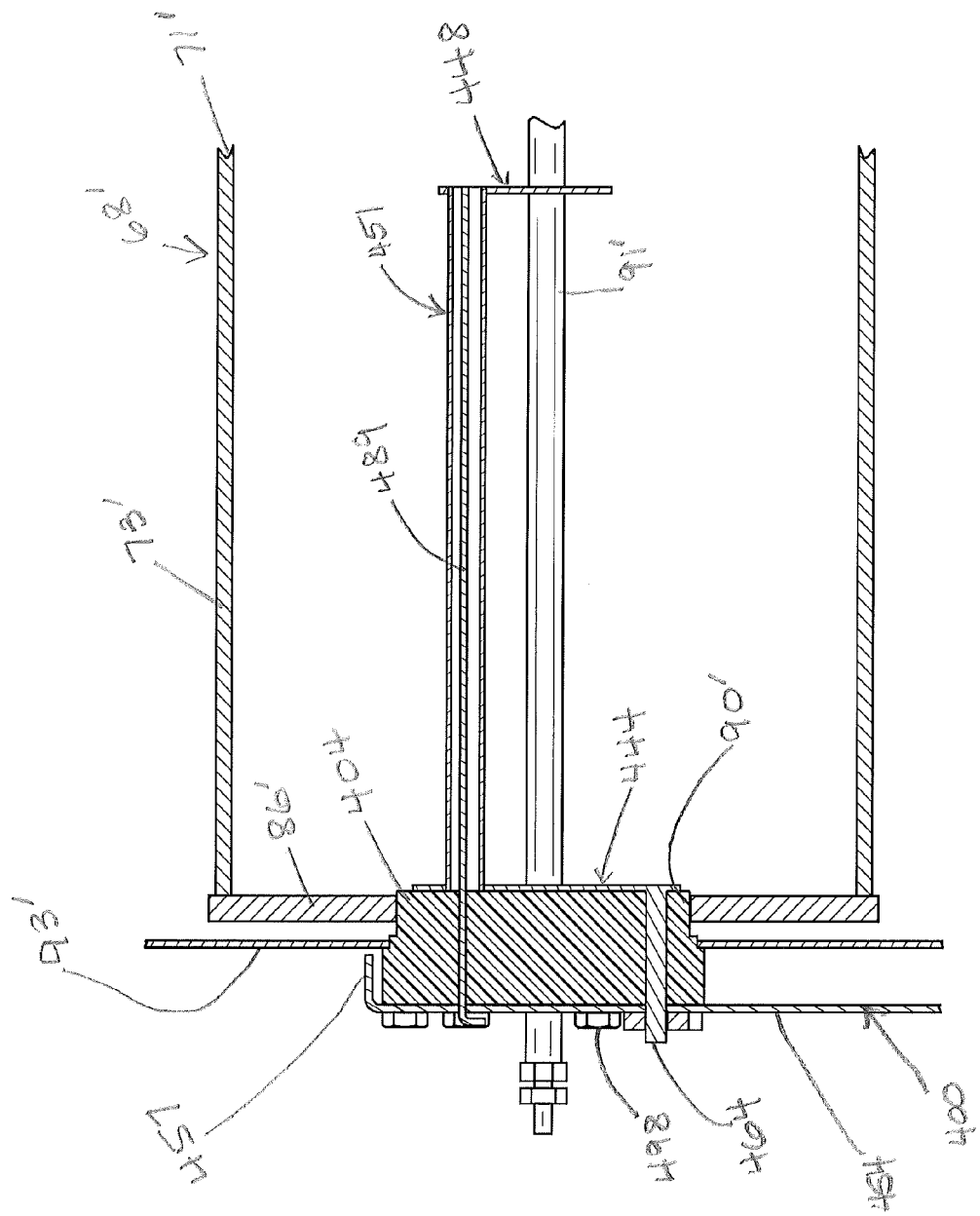
FIG. 27 is a section taken on the line 27-27 of FIG. 25.

As shown in FIG. 27, a thermocouple wire 489 extends through a bore in bearing 404, through bore 491 in plate 444 and through sensor tube 451. Wire 489 is electrically connected to the controls to provide feedback for measuring the temperature within drum 68'. The tube 451 thus performs dual functions of providing a shielded protective conduit for the thermocouple wire 489 as well as acting as a cantilever beam to support hexagonal plate 448 and thereby support the distal end of element 91'. A stud 492 projects from bracket back 454 for mounting a coupling for thermocouple wire 489.

The bearing 404 has four bores 493 extending there through that are aligned with four matching bores 496 in bracket back 454, and receive bolts 498 secured by bolts and washers to hold the bearing 404 securely to the bracket 400.

As seen in FIG. 27, the bearing cylindrical section 408 passes through the cylindrical bore 89' in drum wall 86' so that the outer cylindrical surface 414 of bearing section 408 fits flush against the bore wall surface 90 to provide a snug fit therewith to seal there against, and thus act to hold heat within drum 68'.

Also as shown in FIG. 27, the bearing cylindrical section 417 extends through a hole in base inner wall 93', so that the section's outer cylindrical surface 419 fits flush against the inside of the hole in side 93'. With that, the inner surface 428 of bearing 404 fits flush against the outer surface of sidewall 93', thus stabilize the bearing 404 against wall 93'. The bracket 400 holds the bearing 404 against wall 93' to thus sandwich press the bearing 404 between the bracket 400 and wall 93'. The bracket 400, bearing 404 and ensemble 440 all act together with their various connecting bolts or studs to support element 91'.

The embodiments of FIGS. 21-26 and FIGS. 28-30, are different than the embodiments discussed as to FIGS. 1-12. For example, in FIGS. 21-26 and FIGS. 28-30, the inclination of the top surface 55' and 55" of infeed covers 50', and 50", are at an angle that slopes downwardly towards the drum 68' and 68", respectively, rather than upwardly as in FIGS. 1-12. The angle of inclination of the infeed cover surfaces 55' and 55" to the horizontal diameter through the drums 68' and 68", and to their parallel bottom base surface, is preferably about 25°, and preferably is within a range of about 25° to about 30°, with a wider range of about 20° to 40°. The surface 55' and 55" can be dimpled. Such angling facilitates the tortilla moving upwardly along with the drum surface 52' and 52". However, depending on the position in which the assembly 30' or 30" is placed, having the infeed surfaces extending horizontal relative to the horizontal diameter of the drum may be more preferable from an ergonomic standpoint.

Figure 25:
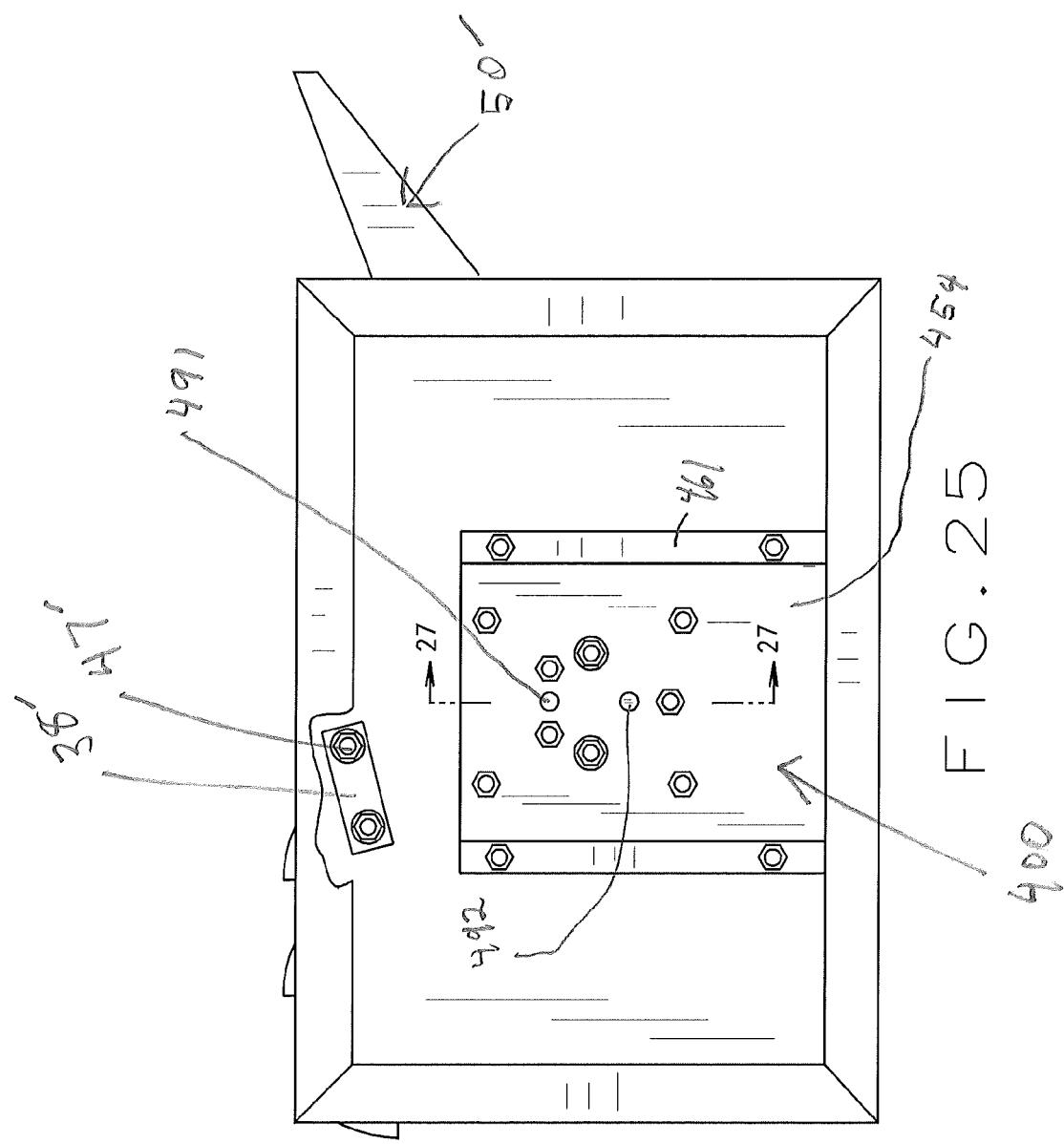
FIG. 25 is a side elevation of the bracket for support of the drum and its heating element, for the embodiment of FIG. 21, with the side cover and some parts removed, viewed looking from the left of FIG. 21.
Figure 26:
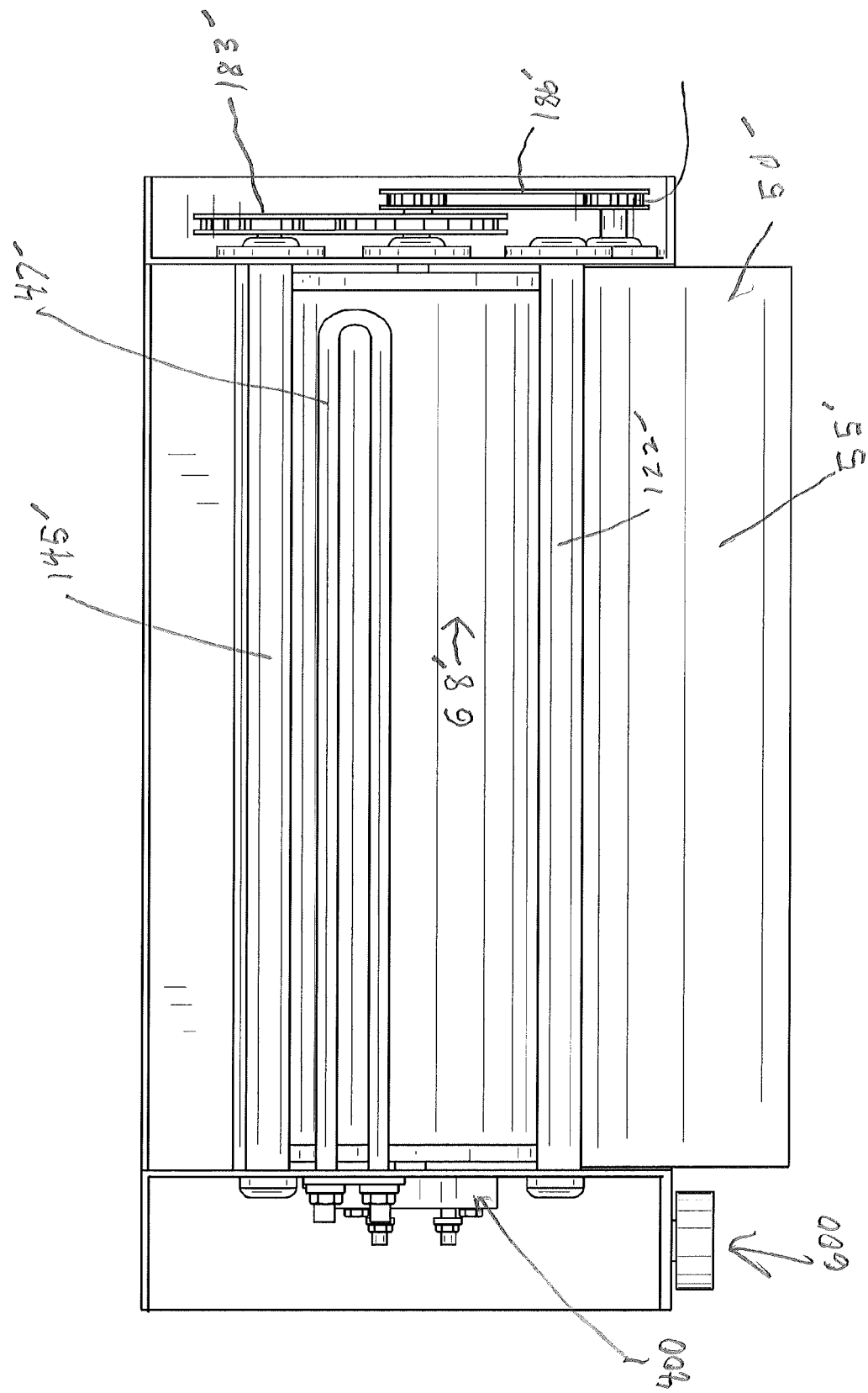
FIG. 26 is a top plan view of the embodiment of FIG. 21, with the top cover removed.
Figure 28:
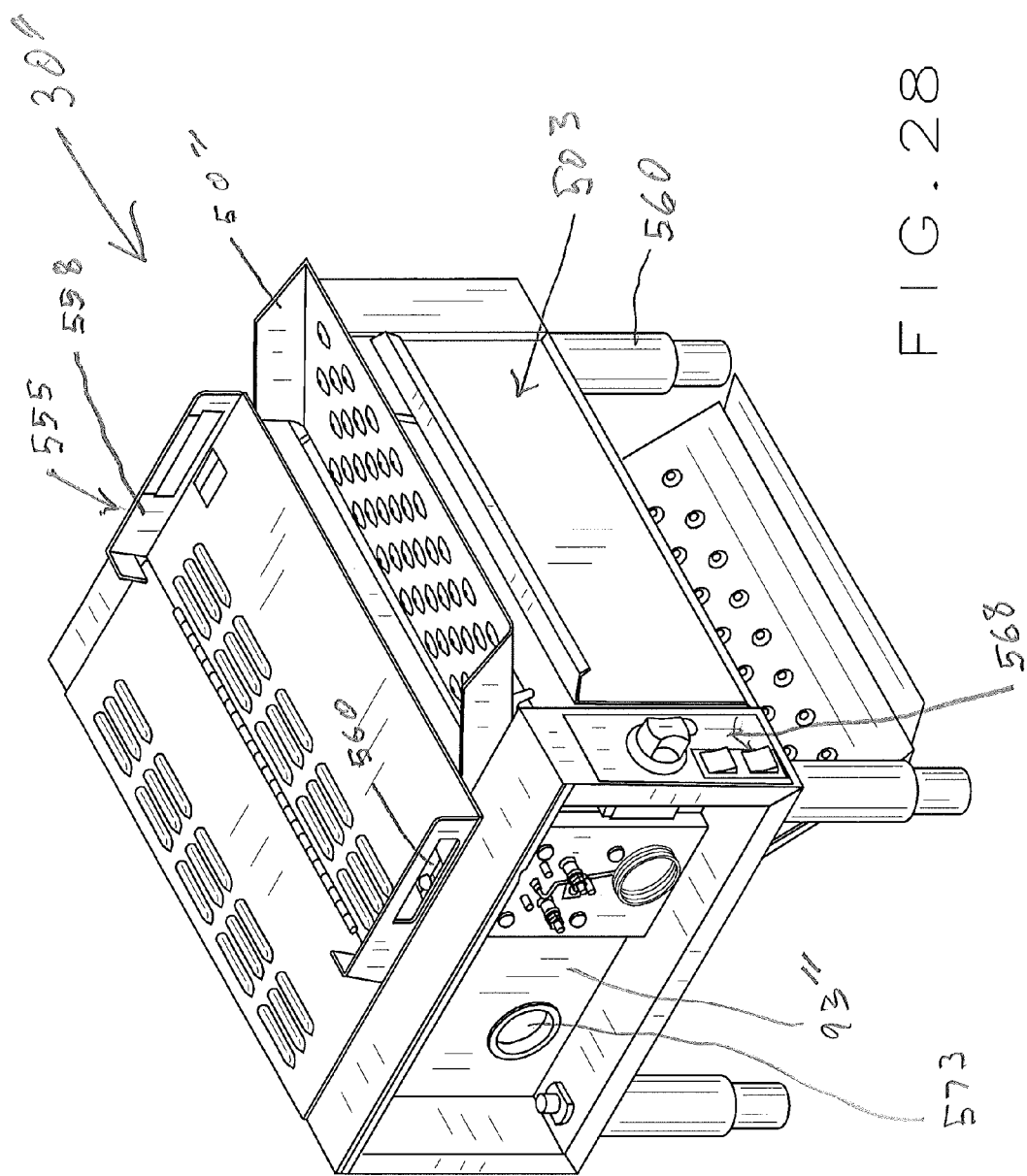
FIG. 28 is an isometric view of another alternative embodiment of a heating assembly.
Figure 29:
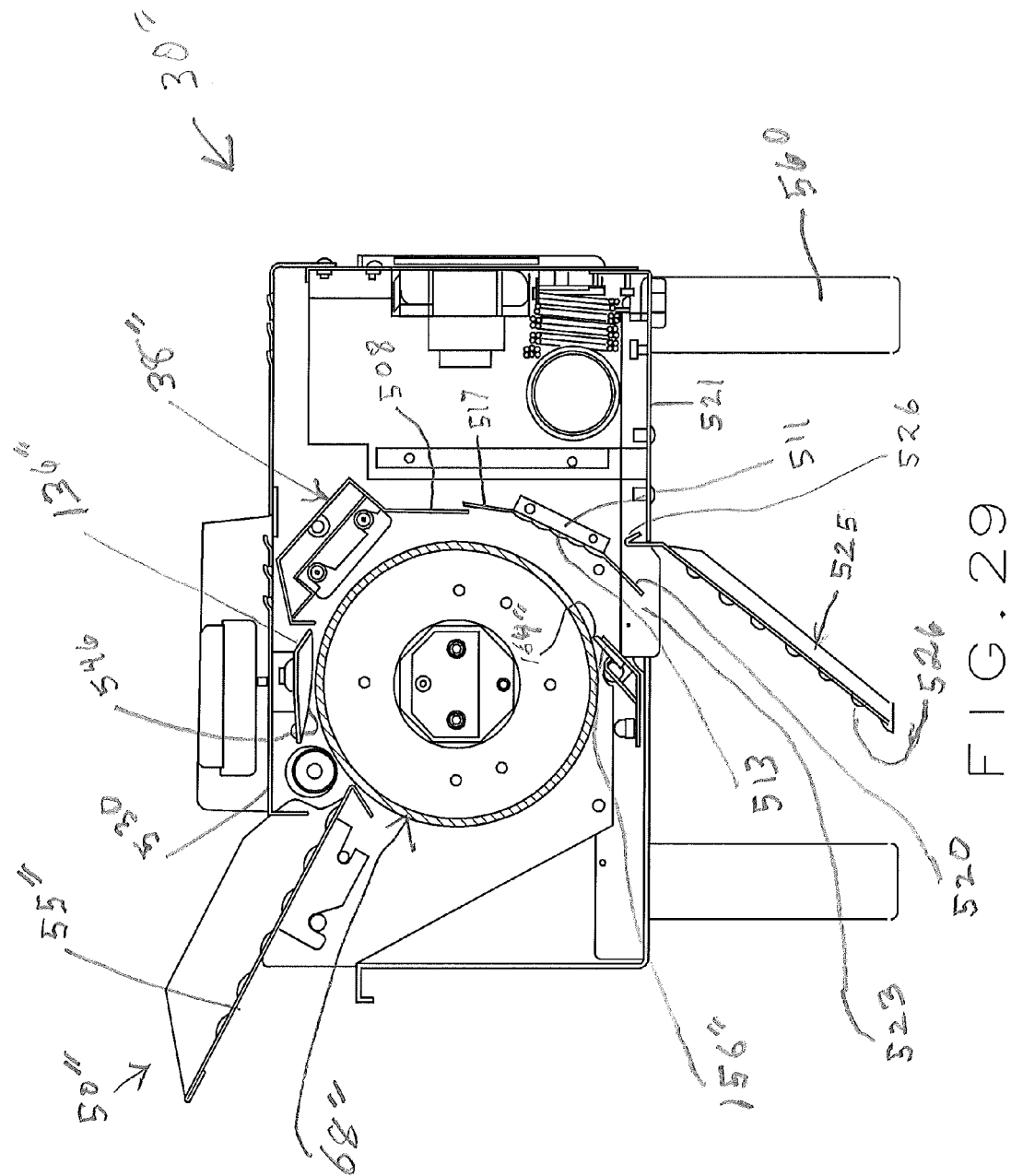
FIG. 29 is section of the interior of the embodiment of FIG. 28.

Also, in FIGS. 25 and 26 and FIG. 29, the radiant heating element 47' and 47", rather than being shown as two separate heating elements as in FIGS. 2 and 3, are shown as a U-shaped element 47' and 47", respectively. Further, in FIGS. 25-26 and 28 the U-shaped element 47' and 47" are each located more towards the rear of the drum so as to be positioned to the rear of a vertical line extending through the center of each drum 68' and 68", respectively. Preferably the radiant heating element 47' and 47" is at angle of about 130°, and preferably in the range of an arc that extends from about 120° to about 140° relative to the horizontal axis through the center of drums 91' and 91", respectively.

The drive system and roller arrangement is also different for the embodiments of FIGS. 21-25 and 28-30 than for FIGS. 1-12.

Figure 24:
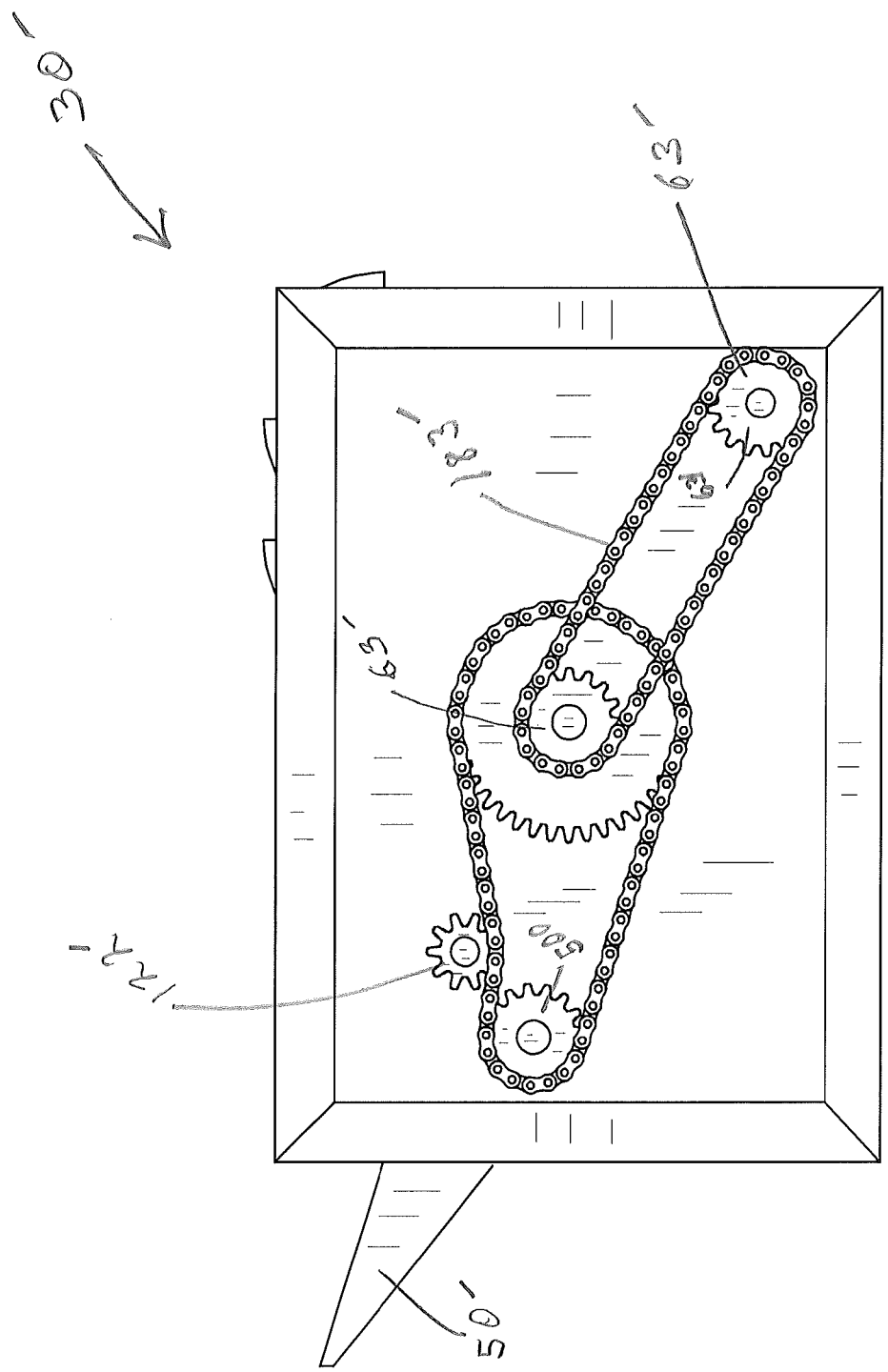
FIG. 24 is a side elevation of the drive assembly for the embodiment of FIG. 21, with the side cover and some parts removed, viewed looking from the right of FIG. 21.

As shown in FIG. 24, as well as in FIG. 30, the motor drive sprockets 63' and 63" are drivingly engaged to a drive chain 183' and 183", respectively that loops around a smaller sprocket 63' and 63" that is drivingly engaged to a drum shaft 78' and 78", respectively.

Also in FIGS. 24 and 30, each drive chain 186' and 186" loops about the larger sprocket 83' and 83", respectively, that is drivingly connected to drum shafts 78' and 78" to rotate with drum 68' and 68". The chains 186' and 186" each loop about an idler sprocket 500 and 502, respectively, that is rotatably mounted to the base or housing sidewall. Each sprocket 500 and 502 is positioned so that its bottom portion is in driving engagement with each chain 186' and 186", respectively. Each infeed roller 122' and 122" is connected to its drive sprocket 132' and 132", respectively, which is located above its respective chain 186' and 186". Therefore, as the chains 183' and 183" each are driven to rotate drums 68' and 68", respectively, in a clockwise direction from the perspective of FIGS. 24 and 30, each sprocket 500 and 502 for infeed rollers 122' and 122", is rotated in a counterclockwise direction from the perspective of FIGS. 24 and 30. Thus, in the FIGS. 21-25 and FIGS. 28-30, embodiments, each infeed roller rotating in a counterclockwise direction draws the tortilla into engagement with the drum which is driven upwardly in a clockwise direction to draw the tortilla to extend about it.

The embodiment of FIGS. 28-30 also do not have a discharge roller 145 and its sprocket 153, shown in the FIGS. 1-12 embodiment. The radiant heating element 47" is U-shaped with two legs, and is shown attached to a supporting hood 38" that is mounted to the sides of the base or housing to extend transversely across the housing. Hood 38" is not as deep front to rear as hood 38 of FIGS. 1-12. Shown more clearly in FIG. 29, are guides for directing a tortilla in a downwardly direction. Fixedly connected to as by screws, and extending downwardly from the back wall 505 of hood 38", is a guide flange 508. Positioned downwardly from flange 508 is a guide slide 511, that has flange side ends secured to the sidewalls of the base or housing as by nuts and bolts. Slide 511 has a dimpled surface 513 that faces the drum 68". The slide 511 has connected to its top as by nuts and bolts an upwardly extending flange 517, and connected as by nuts and bolts to, and a extending downwardly therefrom, a flange 520. The housing floor 521 has an opening 523 through which flange 520 can extend. A lower slide 525 has a hooked upper end 526 that can be secured to a pin or against the housing floor 521 to be supported thereby. The slide 525 has a dimpled surface 526 that faces towards the front of the assembly. The bottom end of slide can fit in a receiving tray or the like to allow tortillas to be received therein. If the tortilla separates from the drum surface 73" after it passes beneath the radiant heater element 47", the guide flanges 508, 517 and 520 and slide surface 526 will come into contact with the tortilla to direct the tortilla to flow downwardly along drum surface 73" until it exits through opening 523.

FIG. 28 also shows a scraper 156" secured to the housing floor 521, as by bolts and nuts. Scraper 156" is located in a different position than in FIGS. 1-12, towards the bottom of the drum 68". Should the tortilla not separate from the drum surface 73" as the tortilla is transported downwardly, the scraper blade edge 164" will engage the tortilla to separate it from drum surface 73" so that it can be thereby directed to fall through the opening 523 towards lower slide 525.

Rather than using a gridded guide frame 136 shown in the FIGS. 1-12 embodiment, the embodiment of FIGS. 21-25 and 28-30, feature a guide frame 136" such as shown in FIGS. 29 and 31-33. The guide frame 136" can be secured to the underside of the top cover 530 as by its angled flanges 535. Guide 136" has a transversely extending strut 538 which has extending about it a layer 540 of cloth or fabric-like material, which has its outer surface coated with a stick resistant coating such as PTFE or the like. A mounting strip 543 extends transversely across the top of strut 538 and is held thereto as by nuts and bolts to hold the fabric layer to the strut 538. As shown more specifically in FIG. 33, the lower part of layer 540 has some slack so that it slightly droops downwardly. As seen in FIG. 29, the lower strip of the layer 540 has its outer surface 546 facing downwardly towards the drum surface 73". Should the tortilla separate from the drum surface 73" directly after it leaves infeed roller 122", the layer's lower surface 546 will engage the tortilla to guide it downwardly to continue contact with the drum surface 73" as the tortilla passes toward and under the radiant heating element 47".

In FIG. 28 is shown cover 555 having a handle 558 which can be secured to the top of the housing as by a pin and slot arrangement 560, and thus removed to expose a view of the drum. The FIG. 28-30 assembly can have a crumb tray arrangement 503. The assembly 30' has controls 568 which are located towards the front left of FIG. 28, for turning the assembly on and off, and for thermostatic control of the temperature. The sidewall 93" has an opening 573 to receive electrical wires that lead to the motor and control compartment. Other aspects of the embodiment of FIGS. 28-30 are that it features a housing that is supported by legs 560. The bottom of the legs 560 can rest on a counter, table or on the floor. The lower slide 525 can be linked at its upper end to the slide 511 to hang therefrom and pivot relative thereto. The slide 511 and its flanges, and slide 525, can be one continues piece of sheet metal with multiple bends. If desired, the lower slide 525 can be removed and the tortillas can drop from the drum to land in a tray positioned, such as on a counter upon which the assembly's legs are supported, for example.

Figure 22:
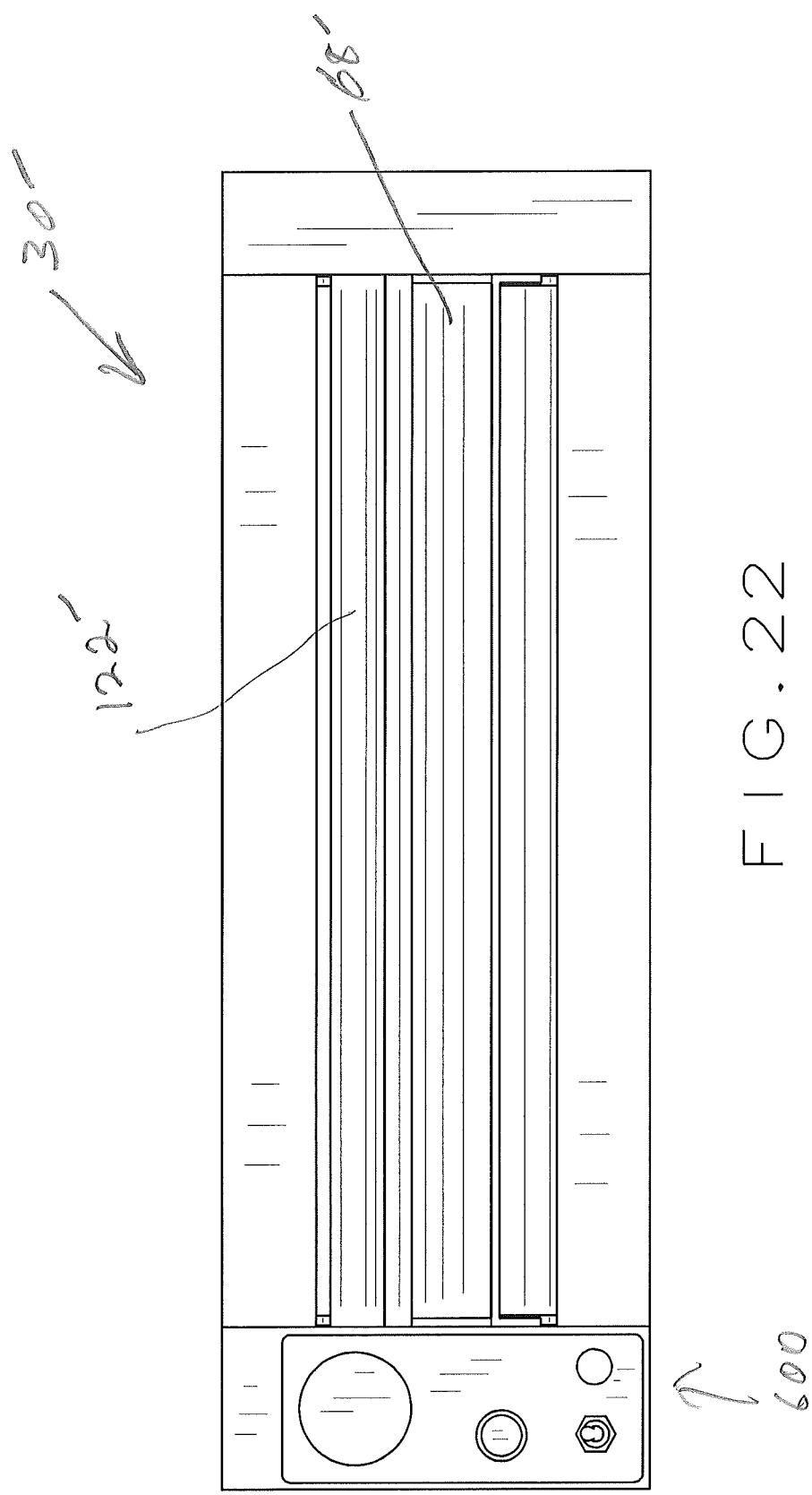
FIG. 22 is a front elevation of the embodiment of FIG. 21.
Figure 23:
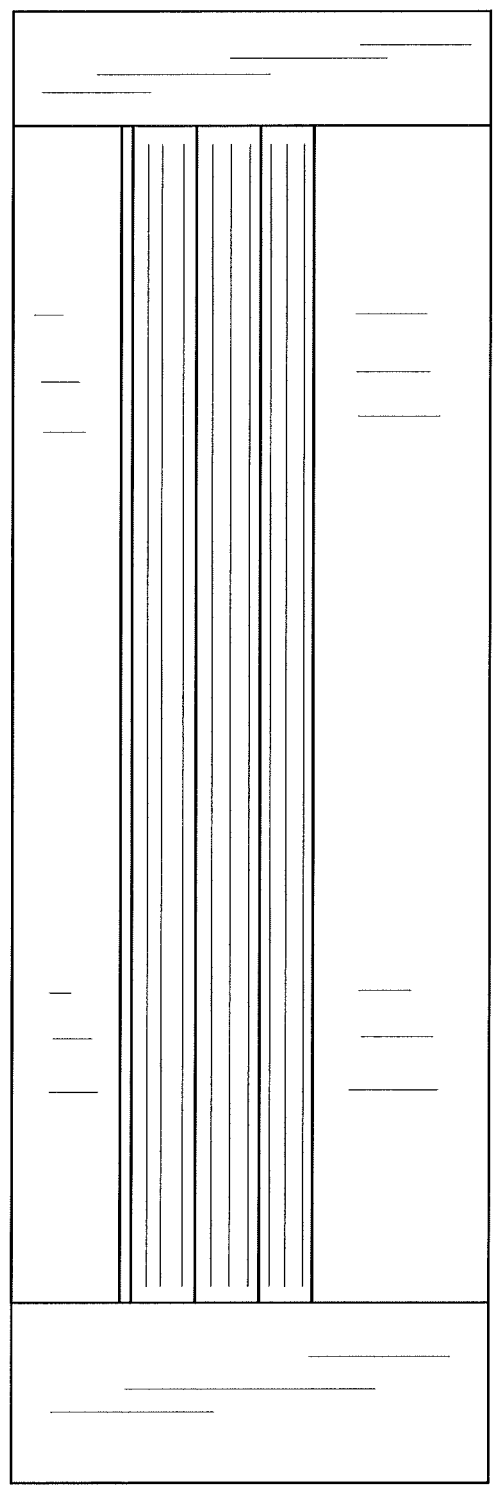
FIG. 23 is a rear elevation of the embodiment of FIG. 21.

The assembly 30' of the FIGS. 21-25 embodiment likewise has features such as the controls 600 shown to the left of FIG. 21 and FIG. 22. Assembly 30' can also be provided with a removable top cover, which when removed exposes the drum, and can also have a crumb tray arrangement.

Additionally, multiple heated rollers can be used. Two heated drums and two heated rollers could be stacked nearly on top of each other. After traveling around the upper heated drum, a slide scraper can direct the tortilla to the infeed roller of a second, lower, heated drum. Such a design could accomplish heating both sides by contact rather than by a combination of infrared and contact heating.

In view of the above, it will be seen that advantages of the invention are achieved and advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A warmer assembly for warming flexible bread food, the flexible bread food having a first lower surface and an oppositely facing second upper surface, the thickness of the bread food between the said first and second surfaces being approximately one-half inch or less, comprising:
    a housing;
    an infeed roller having an approximately cylindrical exterior surface and a diameter, said diameter extending through the infeed roller's center from opposite roller exterior surfaces points, the infeed roller being rotatably mounted with the housing to rotate in a first rotational direction;
    a heatable drum having a wall, said drum wall having an approximately cylindrical exterior surface and a diameter, said diameter generally extending through the drum's center from opposite drum wall exterior surfaces points, the ratio of the said drum diameter being at least four times greater than the said diameter of the infeed roller;
    said drum rotatably mounted with the housing to rotate in a rotational direction counter to the direction of rotation of the infeed roller; the drum at any point of its rotational position having, relative to a horizontal plane, an upper half cylindrical section and a lower half-cylindrical section, the drum rotational mounting defining a rotational path of the drum exterior surface;
    the housing, infeed roller and drum being configured, positioned and spaced relative to each other to form an infeed space having an interface between the drum exterior cylindrical surface and the infeed roller exterior cylindrical surface, the interface having a width configured for the drum exterior surface to contact the bread food first lower surface and for the infeed roller exterior surface to contact the bread food second upper surface, with the direction of the rotational path of the drum exterior surface at the interface and the rotational direction of the infeed roller at the interface both being in an upwardly direction; and
    a radiant heater for radiating heat, said radiant heater being mounted with the housing and positioned relative to the rotational path to be beyond the infeed roller, and located to be spaced to the outside of the drum's exterior cylindrical surface to radiate heat in a direction toward a part of the upper half cylindrical exterior drum surface.

2. The food warming assembly of claim 1, further comprising a second heater for heating the drum, at least part of the second heater being positioned within the drum.

3. The food warming assembly of claim 1, further comprising a guide frame mounted to be stationary in relation to the housing and positioned outwardly from the drum surface in the upper hemi-cylindrical drum section, the guide frame positioned and configured for contacting a bread food that separates from the drum exterior surface to guide the bread food toward the drum exterior surface.

4. The food warming assembly of claim 1, further comprising an infeed platform having a substantially flat infeeding surface that has a distal end and a proximal end, the said proximal end extending adjacent to, but spaced from, the exterior drum surface, the platform surface being sized and configured for bread food to lie upon it and slide upon it toward the infeed roller.

5. The food warming assembly of claim 1, further comprising a discharge roller rotatably mounted with the housing at a point in the drum rotational path beyond the radiant heater to rotate in a direction counter to the direction of rotation of the drum, and positioned relative to the drum and configured so that simultaneously the drum surface can contact the first lower bread food surface and the discharge roller surface can contact the second upper surfaces of the bread food.

6. The food warming assembly of claim 5, wherein the said drum diameter is from about four inches to about nine inches, the said discharge roller diameter is from about one inches to about two inches, and the said infeed roller diameter is from about one inches to about two inches.

7. The food warming assembly of claim 5, wherein said drum diameter is about six inches, the said infeed roller diameter is about one inch, and the said discharge roller diameter is about one inch.

8. The food warming assembly of claim 1, further comprising a discharge scraper having a blade with an edge, the scraper being mounted with the housing and configured and positioned relative to the drum, so its blade edge is located relative to the drum surface at a point in the rotational path beyond the radiant heater so it can contact the bread food first lower surface to separate it from the drum.

9. The food warming assembly of claim 1, wherein the radiant heater is mounted with the housing and positioned to radiate heat in a direction generally normal toward a part of the drum surface in the upper half-cylindrical section that is closest to the radiant heater than any other parts of the drum surface.

10. The food warming assembly of claim 1, further comprising a motor mounted with the housing, the motor having a shaft, and a drive assembly in driving connection with the motor shaft and in connection with the drum and infeed roller, the drive assembly, drum surface and infeed roller surface having dimensions and being configured to drive the drum surface at a speed that is approximately equal to the infeed roller surface speed.

11. The food warming assembly of claim 1, wherein the said drum diameter is from about four inches to about nine inches.

12. The food warming assembly of claim 11, wherein the said infeed roller diameter is from about one inches to about two inches.

13. A warmer assembly for warming flexible bread food, the flexible bread food having a first lower surface and an oppositely facing second upper surface, the thickness of the bread food between the said first and second surfaces being approximately one-half inch or less, comprising:
a housing;
an infeed roller having an approximately cylindrical exterior surface and a diameter, said diameter extending through the infeed roller's center from opposite roller exterior surfaces points, the infeed roller being rotatably mounted with the housing to rotate in a first rotational direction;
a heatable drum having a wall, said drum wall having an approximately cylindrical exterior surface and a diameter, said diameter generally extending through the drum's center from opposite drum wall exterior surfaces points, the ratio of the said drum diameter being at least four times greater than the said diameter of the infeed roller;
said drum rotatably mounted with the housing to rotate in a rotational direction counter to the direction of rotation of the infeed roller; the drum at any point of its rotational position having, relative to a horizontal plane, an upper half cylindrical section and a lower half-cylindrical section, the drum rotational mounting defining a rotational path of the drum exterior surface;
the housing, infeed roller and drum being configured, positioned and spaced relative to each other to form an infeed space having an interface between the drum exterior cylindrical surface and the infeed roller exterior cylindrical surface, the interface having a width configured for the drum exterior surface to contact the bread food first lower surface and for the infeed roller exterior surface to contact the bread food second upper surface, with the direction of the rotational path of the drum exterior surface at the interface and the rotational direction of the infeed roller at the interface both being in an upwardly direction;
a radiant heater for radiating heat, said radiant heater being mounted with the housing and positioned relative to the rotational path to be beyond the infeed roller, and located to be spaced from the drum's exterior cylindrical surface to radiate heat in a direction toward a part of the upper half cylindrical exterior drum surface;
a second heater for warming the drum, at least part of the second heater being positioned within the drum;
a guide frame mounted to be stationary in relation to the housing and positioned outwardly from the drum surface in the upper hemi-cylindrical drum section, the guide frame positioned and configured for contacting a bread food that separates from the drum exterior surface to guide the bread food toward the drum exterior surface; and
an infeed platform having a substantially flat infeeding surface that has a distal end and a proximal end, the said proximal end extending adjacent to, but spaced from, the exterior drum surface, the platform surface being sized and configured for bread food to lie upon it and slide upon it toward the infeed roller.

14. The food warming assembly of claim 13, further comprising a discharge scraper having a blade with an edge, the scraper being mounted with the housing and configured and positioned relative to the drum, so its blade edge is located relative to the drum surface at a point in the rotational path beyond the radiant heater so it can contact the bread food first lower surface to separate it from the drum.

15. The food warming assembly of claim 13, wherein the radiant heater is mounted with the housing and positioned to radiate heat in a direction generally normal toward a part of the drum surface in the upper half-cylindrical section that is closest to the radiant heater than any other parts of the drum surface.

16. The food warming assembly of claim 15, wherein the said drum diameter is from about four inches to about nine inches and wherein the said infeed roller diameter is from about one inches to about two inches.

17. The food warming assembly of claim 13, further comprising a discharge roller having an exterior cylindrical surface and rotatably mounted with the housing at a point in the drum rotational path beyond the radiant heater to rotate in a direction counter to the direction of rotation of the drum, and positioned relative to the drum and configured to form a discharge space having an interface between the drum exterior cylindrical surface and the discharge roller exterior cylindrical surface, so that simultaneously the drum surface can contact the first lower bread food surface and the discharge roller surface can contact the second upper surfaces of the bread food, the direction of the rotational path of the drum exterior surface at the interface and the rotational direction of the discharge roller at the interface both being in a downwardly direction.

18. The food warming assembly of claim 13, wherein the said drum diameter is from about four inches to about nine inches and wherein the said infeed roller diameter is from about one inches to about two inches.

19. The food warming assembly of claim 13, wherein the said drum diameter is about six inches, and wherein the said infeed roller diameter is about one inch.

20. The food warming assembly of claim 13, further comprising a motor mounted mounted with the housing, the motor having a shaft, and a drive assembly in driving connection with the motor shaft and in connection with the drum and infeed roller, the drive assembly, drum surface and infeed roller surface having dimensions and being configured to drive the drum surface at a speed that is approximately equal to the infeed roller surface speed.

21. A method for warming flexible bread food, the flexible bread food having a first lower surface and an oppositely facing second upper surface, the thickness of the bread food between the said first and second surfaces being approximately one-half inch or less, comprising the steps of:
  the bread food passing between an infeed roller having a cylindrical exterior surface and a drum having a cylindrical exterior surface that is at least four times the diameter of the infeed roller diameter;
  simultaneously rotating the infeed roller in a first rotational direction, and the drum exterior cylindrical surface in a second rotational direction that is counter to the first rotational directional of the infeed roller, the drum at any point of its rotational position having an upper half cylindrical section and a lower half cylindrical section, the rotation of the drum exterior surface defining a rotational path;
  the bread food moving between the drum exterior surface and infeed roller exterior surface, then the bread food moving along the rotational path of the drum exterior surface while it lies on the part of the upper half cylindrical section of rotating drum surface; and
  warming the bread food with a heater positioned to the outside of the drums exterior cylindrical surface, the heat radiating from the heater in the direction of the bread food while the bread food is positioned on part of the upper half cylindrical drum section.

22. The method of claim 21, further comprising the steps of:
  after the bread food moves between the drum exterior surface and the infeed roller, the bread food second upper surface is facing outwardly from the drum; and
  wherein the radiating heat is radiated in a direction toward and generally normal to the second upper surface of the bread food.

23. The method of claim 22, further comprising:
  after the bread food has been radiated by the radiant heater, the step of the bread food separating from contact with the exterior cylindrical drum surface.

24. The method of claim 23, further comprising the step of heating the interior of the drum wall by a second heater.

25. The method of claim 24 further comprising the steps of:
  after the bread food moves between the exterior drum surface and the infeed roller surface, the bread food second upper surface is facing outwardly from the drum; and
  guiding the movement of the bread food along the drum's exterior surface with a guide frame that is mounted to be stationary relative to the housing, the guide frame distanced from the drum surface, the guide frame contacting the second upper surface of a bread food that separates from the drum exterior surface as it is moved by the drum upper half section exterior surface, and guiding the bread food in a direction towards the drum upper half section exterior surface as the bread food is moved by the drum exterior surface.

26. The method of claim 24:
  further comprising an infeed platform having a substantially flat infeeding surface, which infeeding surface has a distal end and a proximal end that extends adjacent the drum infeeding surface, and further comprising the step of the bread food moving along the infeeding surface and thence moving to contact the drum upper half section exterior surface, and the bread food moving upwardly along the rotational path of the upper half section.

27. A method for warming flexible bread food, the flexible bread food having a first lower surface and an oppositely facing second upper surface, the thickness of the bread food between the said first and second surfaces being approximately one-half inch or less, comprising the steps of:
  the bread food passing between an infeed roller having a cylindrical exterior surface and a drum having a cylindrical exterior surface that is at least four times the diameter of the infeed roller diameter;
  simultaneously rotating the infeed roller in a first rotational direction, and the drum exterior cylindrical surface in a second rotational direction that is counter to the first rotational directional of the infeed roller, the drum at any point of its rotational position having an upper half cylindrical section and a lower half cylindrical section, the rotation of the drum exterior surface defining a rotational path;
  the bread food moving between the drum exterior surface and infeed roller exterior surface, then the bread food moving along the rotational path of the drum exterior surface while it lies on part of the upper half cylindrical section of rotating drum surface;
  warming the bread food with a heater radiating heat in a direction toward and generally normal to the second upper surface of the bread food while the bread food is positioned on part of the upper half cylindrical drum section with the bread food second upper surface facing outwardly from the drum;
  after the bread food has been radiated by the radiant heater, the step of the bread food separating from contact with the exterior cylindrical drum surface;
  the step of heating the interior of the drum wall by a second heater, to warm the bread food; and
  after the flexible bread food moves between the drum surface and the infeed roller surface and the flexible bread food first surface is facing outwardly from the drum, guiding the movement of the flexible bread food along the drum's surface with a guide frame that is distanced from the drum surface, the guide frame contacting the first surface of the flexible bread food that separates from the drum surface as it is moved by the drum surface and guiding the flexible breadfood in a direction towards the drum's surface as the flexible bread food is moved by the drum surface.

28. The method of claim 27, wherein the said drum diameter is from about four inches to about nine inches, and the said infeed roller diameter is from about one inch to about two inches.

29. The method of claim 27, wherein the said drum diameter is about six inches, and the said infeed roller diameter is about one inch.

* * * * *